United States Patent
Hughes et al.

(10) Patent No.: US 10,406,962 B2
(45) Date of Patent: Sep. 10, 2019

(54) STORAGE MANAGEMENT SYSTEM

(71) Applicant: Solaris Oilfield Site Services Operating LLC, Houston, TX (US)

(72) Inventors: Tamara Hughes, Houston, TX (US); Terry McIver, Santa Anna, TX (US); John Cunningham, Early, TX (US); William Vaughn Managan, II, Rochelle, TX (US); Joe Daniel Matkowski, San Antelo, TX (US)

(73) Assignee: Solaris Oilfield Site Services Operating LLC, Houston, TX (US)

( * ) Notice: Subject to any disclaimer, the term of this patent is extended or adjusted under 35 U.S.C. 154(b) by 0 days.

(21) Appl. No.: 16/011,541

(22) Filed: Jun. 18, 2018

(65) Prior Publication Data

US 2018/0297503 A1 Oct. 18, 2018

Related U.S. Application Data

(63) Continuation of application No. 15/626,653, filed on Jun. 19, 2017.
(Continued)

(51) Int. Cl.
*B60P 1/00* (2006.01)
*B60P 1/48* (2006.01)
*B60P 1/64* (2006.01)
*B60P 3/00* (2006.01)
(Continued)

(52) U.S. Cl.
CPC ........ *B60P 1/483* (2013.01); *B01F 15/00155* (2013.01); *B01F 15/0479* (2013.01);
(Continued)

(58) Field of Classification Search
CPC ....... B60P 1/483; B60P 1/6418; B60P 1/6427; B60P 3/00; B01F 15/00155;
(Continued)

(56) References Cited

U.S. PATENT DOCUMENTS 2,606,676 A   8/1952   Dempster
2,642,979 A   6/1953   Beech
(Continued)

FOREIGN PATENT DOCUMENTS

CA   2653370 A1   8/2010
CA   2964009 A1   12/2017
(Continued)

OTHER PUBLICATIONS

PCT Interational Search Report and Written Opinion dated Mar. 30, 2015 for related PCT app. No. PCT/US2012/061483.
(Continued)

*Primary Examiner* — Anshu Bhatia
(74) *Attorney, Agent, or Firm* — Elizabeth R. Hall & Associates, P.C; Elizabeth R. Hall

(57) ABSTRACT

Embodiments of the present invention include a method and system for blending multi-component granular compositions such as proppant used in hydraulic fracturing in well drilling. The system includes the control and management of an on-site storage system for each of the components, regulating the delivery of specified quantities of each component to a well site, and coordinating the flow of materials into and out of the blender.

13 Claims, 19 Drawing Sheets

Related U.S. Application Data

(60) Provisional application No. 62/352,037, filed on Jun. 20, 2016.

(51) Int. Cl.
*B65D 88/30* (2006.01)
*B65D 88/32* (2006.01)
*B65G 65/34* (2006.01)
*B65G 65/42* (2006.01)
*B01F 15/00* (2006.01)
*B01F 15/04* (2006.01)
*G05D 11/13* (2006.01)
*E21B 43/267* (2006.01)

(52) U.S. Cl.
CPC .......... *B60P 1/6418* (2013.01); *B60P 1/6427* (2013.01); *B60P 3/00* (2013.01); *B65D 88/30* (2013.01); *B65D 88/32* (2013.01); *B65G 65/34* (2013.01); *B65G 65/42* (2013.01); *G05D 11/132* (2013.01); *B01F 2215/0081* (2013.01); *E21B 43/267* (2013.01)

(58) Field of Classification Search
CPC ......... B01F 15/0479; B01F 2215/0081; B65D 88/30; B65D 88/32; B65G 65/34; B65G 65/42; G05D 11/132; E21B 43/267
See application file for complete search history.

(56) References Cited

U.S. PATENT DOCUMENTS

| | | | |
|---|---|---|---|
| 2,808,164 A | 10/1957 | Glendinning | |
| 3,151,849 A | 10/1964 | Maxon, Jr. | |
| 3,160,289 A | 12/1964 | Leefer | |
| 3,208,616 A | 9/1965 | Haskins | |
| 3,313,435 A | 4/1967 | Welk | |
| 3,314,557 A | 4/1967 | Sackett, Sr. | |
| 3,343,688 A | 9/1967 | Ross | |
| 3,415,498 A | 12/1968 | Zaccaron | |
| 3,448,866 A | 6/1969 | Perry et al. | |
| 3,476,270 A * | 11/1969 | Cox | B28C 7/0495 414/21 |
| 3,547,291 A | 12/1970 | Dempster | |
| 3,618,801 A | 11/1971 | Blanchard | |
| 3,622,026 A | 11/1971 | Tornheim | |
| 3,666,129 A | 5/1972 | Haskins | |
| 3,687,319 A | 8/1972 | Adam et al. | |
| 3,848,758 A | 11/1974 | Carter | |
| 3,934,739 A | 1/1976 | Zumsteg et al. | |
| 3,963,149 A | 6/1976 | Fassauer | |
| 3,985,254 A | 10/1976 | Grandury | |
| 4,111,314 A | 9/1978 | Nelson | |
| 4,163,626 A | 8/1979 | Batterton et al. | |
| 4,337,014 A | 6/1982 | Farnham | |
| 4,392,567 A | 7/1983 | Glebov | |
| 4,453,878 A | 6/1984 | Paukku | |
| 4,465,420 A | 8/1984 | Dillman | |
| 4,561,821 A | 12/1985 | Dillman | |
| 4,621,972 A | 11/1986 | Grotte | |
| 4,626,166 A | 12/1986 | Jolly | |
| 4,634,335 A | 1/1987 | Van Den Pol | |
| 4,643,292 A | 2/1987 | Whited | |
| 4,708,569 A | 11/1987 | Nijenhuis | |
| 4,755,097 A | 7/1988 | Corompt | |
| 4,775,275 A | 10/1988 | Perry | |
| 4,810,159 A | 3/1989 | Stegmuller | |
| 4,855,960 A | 8/1989 | Janssen et al. | |
| 4,944,646 A | 7/1990 | Edwards et al. | |
| 4,963,070 A | 10/1990 | Detrick | |
| 4,986,719 A | 1/1991 | Galbreath | |
| 5,044,861 A | 9/1991 | Kirchhoff et al. | |
| 5,082,416 A | 1/1992 | Bock | |
| 5,102,284 A | 4/1992 | Raisio | |
| 5,108,247 A | 4/1992 | Vlaanderen | |
| 5,163,800 A | 11/1992 | Raisio | |
| 5,281,023 A | 1/1994 | Cedillo et al. | |
| 5,441,340 A | 8/1995 | Cedillo et al. | |
| 5,542,807 A | 8/1996 | Kruzick | |
| 5,775,852 A | 7/1998 | Boutte | |
| 5,957,331 A | 9/1999 | Minor | |
| 6,007,227 A * | 12/1999 | Carlson | E21B 43/267 700/239 |
| 6,173,214 B1 * | 1/2001 | Neelay | G06Q 10/04 137/487.5 |
| 6,193,402 B1 * | 2/2001 | Grimland | B01F 3/1221 366/14 |
| 6,276,516 B1 | 8/2001 | Bagust | |
| 6,474,926 B2 | 11/2002 | Weiss | |
| 6,672,342 B2 | 1/2004 | Nussbaumer | |
| 6,869,261 B2 | 3/2005 | Burke | |
| 7,214,028 B2 | 5/2007 | Boasso et al. | |
| 7,278,816 B2 | 10/2007 | Marmur et al. | |
| 7,341,419 B1 | 3/2008 | Fink et al. | |
| 7,712,632 B2 | 5/2010 | Schwass | |
| 8,142,134 B2 | 3/2012 | Lavoie et al. | |
| 8,319,680 B2 | 11/2012 | Sai | |
| 8,534,452 B2 | 9/2013 | Furuyama | |
| 8,573,917 B2 | 11/2013 | Renyer | |
| 8,585,341 B1 | 11/2013 | Oren | |
| 8,651,792 B2 | 2/2014 | Friesen | |
| 8,708,052 B2 * | 4/2014 | Radi | E21B 19/004 166/250.01 |
| 8,944,740 B2 | 2/2015 | Teichrob | |
| 9,038,865 B2 | 5/2015 | Naizer | |
| 9,150,349 B2 | 10/2015 | Hall | |
| 2003/0202869 A1 | 10/2003 | Posch | |
| 2005/0244256 A1 | 11/2005 | Barry | |
| 2005/0260062 A1 | 11/2005 | Boasso et al. | |
| 2007/0207017 A1 | 9/2007 | Boasso et al. | |
| 2010/0071284 A1 | 3/2010 | Hagan et al. | |
| 2010/0196130 A1 | 8/2010 | Lavoie et al. | |
| 2011/0211418 A1* | 9/2011 | Tassone | B01F 3/18 366/8 |
| 2012/0024738 A1 | 2/2012 | Herman et al. | |
| 2012/0219391 A1 | 8/2012 | Teichrob | |
| 2012/0298478 A1 | 11/2012 | Friesen | |
| 2013/0108402 A1 | 5/2013 | Herman et al. | |
| 2013/0309052 A1 | 11/2013 | Luharuka | |
| 2013/0322995 A1 | 12/2013 | Lopes | |
| 2014/0023465 A1 | 1/2014 | Oren | |
| 2014/0044507 A1 | 2/2014 | Naizer | |
| 2014/0044508 A1 | 2/2014 | Luharuka | |
| 2014/0305769 A1 | 10/2014 | Eiden, III | |
| 2015/0044003 A1 | 2/2015 | Pham | |
| 2015/0044004 A1 | 2/2015 | Pham | |
| 2015/0166260 A1 | 6/2015 | Pham | |
| 2015/0320235 A1 | 11/2015 | Carlson | |
| 2015/0360856 A1 | 12/2015 | Oren | |

FOREIGN PATENT DOCUMENTS

| | | |
|---|---|---|
| DE | 1274989 B | 8/1968 |
| DE | 3329412 A1 | 2/1985 |
| DE | 4019618 A1 | 1/1991 |
| DE | 1108162 A1 | 9/1992 |
| DE | 9418225 U1 | 1/1995 |
| DE | 19513864 A1 | 10/1996 |
| EP | 1142755 A2 | 10/2001 |
| FR | 1370103 A1 | 8/1964 |
| FR | 1486478 A | 6/1967 |
| GB | 934113 A | 8/1963 |
| JP | 57164825 A | 10/1982 |
| JP | 61181733 A | 8/1986 |

OTHER PUBLICATIONS

Canadian Patent Office; Response and Amendment filed in corresponding Canadian application Serial No. 2,971,339; Apr. 13, 2018; 63 pages.

Canadian Patent Office; Notice of Allowance for corresponding Canadian application Serial No. 2,971,339; May 28, 2018; 1 page.

(56) References Cited

OTHER PUBLICATIONS

Canadian Patent Office; Office Action for CA 2971339; Jan. 15, 2018; 4 pages; CA.

* cited by examiner

FIG. 11

STORAGE MANAGEMENT SYSTEM

CROSS-REFERENCE TO RELATED APPLICATIONS

The present application is a continuation of U.S. patent application Ser. No. 15/626,653 filed Jun. 19, 2017, which claims priority under 35 U.S.C. 119(e) to U.S. Provisional Application 62/352,037 filed Jun. 20, 2016, each of which are hereby incorporated by reference in their entireties.

BACKGROUND OF THE INVENTION

Field of the Invention

The present invention relates to systems and methods for delivery, on-site storage and blending of large quantities of multi-component granular compositions. In particular, the present invention relates to a coordinated system for 9the delivery, storage and blending of multi-component granular compositions for use in the oil and natural gas mining and drilling industries at remote locations.

Description of the Related Art

Granular materials, such as sand, are used in bulk quantities in a number of applications. For example, mining companies sometimes make use of a technique termed "hydraulic fracturing" to aid in the extraction of fossil fuels from well sites. Hydraulic fracturing is the propagation of fractures in a rock layer caused by the presence of a pressurized fluid. Hydraulic fractures form naturally, as in the case of veins or dikes, and is one means by which gas and petroleum from source rocks may migrate to reservoir rocks.

In some cases, oil and gas companies may attempt to accelerate this process in order to release petroleum, natural gas, coal seam gas, or other substances for extraction, where the technique is often called "fracking" or "hydrofracking." This type of fracturing is done from a wellbore drilled into reservoir rock formations. The energy from the injection of a highly-pressurized fracking fluid creates new channels in the rock which can increase the extraction rates and ultimate recovery of fossil fuels. When done in already highly-permeable reservoirs such as sandstone-based wells, the technique is known as well stimulation. Operators typically try to maintain fracture width or slow its decline following treatment by introducing a proppant into the injected fluid. A proppant is a material, such as grains of sand, ceramic, or other particulates, that prevents the fractures from closing when the injection is stopped. Consideration of proppant strengths and prevention of proppant failure becomes more important at deeper depths where pressure and stresses on fractures are higher.

Hydraulic fracturing, often performed in remote areas, uses large amounts of granular material that must be shipped into the site. The large amount of granular material required in a fracking operation at a well site requires that these materials be stored close to the well site so that they may be used as needed. Usable storage space at well and drilling sites is frequently very limited due to the terrain at the well sites or other factors related to the inaccessibility of the sites. As a result, storage space for materials necessary for drilling and mining operations is often at a premium. Improving the efficiency and use of storage space at drilling and well sites can have important economic as well as practical benefits for drilling and mining operations.

Typically, tractor trailer rigs are used to transport these materials to well sites. If no or insufficient storage space is available at the well site, it is oftentimes necessary to store the materials in the same tractor trailer rigs that delivered the materials to the well site. This is an inefficient and frequently cost-prohibitive solution to the storage problem because the trailers must be parked until needed. This is costly because the drivers and their trucks are forced to waste valuable time out of service. Thus, the efficient storage of materials at oil and natural gas well sites is a critical factor in the successful implementation of fracking operations.

In addition, to the need for an efficient on-site storage system, there is an existing need for a means to efficiently control the mixing of the stored granular material to produce a prescribed blend of materials to form the desired proppant.

SUMMARY OF THE INVENTION

The present invention relates to a method and system for blending multi-component granular compositions such as proppant used in hydraulic fracturing in well drilling. The system includes the control and management of an on-site storage system for each of the components, the regulation of the delivery of specified quantities of each component to a blender, and the coordination of the flow of materials into and out of the blender.

One embodiment of the present invention is a well site blending system comprising: (a) a blender that blends a set of ingredients into a blend mixture, wherein the blend mixture contains a controlled quantity of each ingredient in the set of ingredients and wherein the blender has a blender monitoring device that dynamically monitors an amount of blend mixture contained in the blender; (b) a plurality of storage containers, wherein at least one storage container contains each ingredient of the blend mixture and wherein each storage container containing one ingredient has a storage container monitoring device that dynamically monitors an amount of the ingredient contained in that storage container; (c) a central feeder oriented to deliver the ingredients of the blend mixture into the blender; (d) an ingredient feeder for each storage container oriented to deliver the ingredient exiting from the storage container to the central feeder; (e) a plurality of feeder regulators, wherein a central regulator controls a blend mixture delivery rate from the central feeder into the blender and one ingredient regulator for each ingredient feeder that controls an ingredient delivery rate from the ingredient feeder to the central feeder; (f) a blender control device that regulates an exit rate of the blend mixture from the blender; and (f) a management system configured to regulate the feeder regulators and the blender control device to regulate the amount of the blend mixture in the blender at any given time is within predetermined limits.

Another embodiment of the present invention is a method for blending ingredients of a blend mixture at a well site including the steps of: (a) deploying a blending system at the well site, wherein the blend system comprises (i) a blender that blends a set of ingredients into a blend mixture, wherein the blend mixture contains a controlled quantity of each ingredient in the set of ingredients and wherein the blender has a blender monitoring device that dynamically monitors an amount of blend mixture contained in the blender; (ii) a plurality of storage containers, wherein at least one storage container contains each ingredient of the blend mixture and wherein each storage container containing one ingredient has a storage container monitoring device that dynamically monitors an amount of the ingredient contained in that storage container; (iii) a central feeder oriented to deliver the ingredients of the blend mixture into the blender; (iv) an ingredient feeder for each storage container oriented to deliver the ingredient exiting from the storage container to the central feeder; (v) a plurality of feeder regulators, wherein a central regulator controls a blend mixture delivery rate from the central feeder into the blender and one ingredient regulator for each ingredient feeder that controls an ingredient delivery rate from the ingredient feeder to the central feeder; (vi) a blender control device that regulates an exit rate of the blend mixture from the blender; and (vii) a management system configured to regulate the feeder regulators and the blender control device to regulate the amount of the blend mixture in the blender at any given time is within predetermined limits and to balance the blend ingredients delivery rate into the blender with the exit rate of the blend mixture from the blender; (b) determining a desired blend delivery rate for the blend ingredients to enter the blender and a desired blend exit rate for the blended ingredients to exit the blender to meet a predetermined limit to an amount of blend ingredients in the blender; (c) instructing the management system to regulate the feeder regulators or the blender control device whenever the blender monitoring device detects the amount of blend ingredients in the blender is outside of the predetermined limit; (d) altering a central regulator setting to adjust the blend delivery rate to the desired blend delivery rate; (e) calculating an ingredient flow rate for each ingredient to achieve an ingredient delivery rate that provides a controlled quantity of each ingredient onto the central feeder to provide the blend mixture into the blender at the desired blend delivery rate; (f) altering each ingredient regulator setting to adjust each ingredient delivery rate to the calculated ingredient flow rate; (g) altering a blender control device setting to adjust the blend exit rate to the desired blend exit rate; (h) evaluating a total usage rate for each ingredient at the well site, wherein all changes to the blend delivery rate, the ingredient delivery rates and the blend exit rate are used to update the evaluation of the total usage rate for each ingredient; (i) creating an ingredient forecast based on the total amount of each ingredient available at the well site, a total amount of each ingredient available at a remote storage facility, the total usage rate for each ingredient, a predetermined limit to the total amount of each ingredient available at the well site, and a delivery time needed to deliver a truck load of the ingredient to the on-site ingredient storage container; and (j) activating an ingredient delivery whenever an upcoming need for additional ingredient at the well is predicted by the ingredient forecast.

Still another embodiment of the present invention is a method for supplying ingredients for a blending project comprising the steps of: (a) monitoring a supply of a plurality of ingredients at a remote storage facility; (b) monitoring a supply of the ingredients at a well site, wherein at least one storage container at the well site contains each ingredient of the blend mixture and wherein each storage container containing one ingredient has a storage container monitoring device that dynamically monitors an amount of the ingredient contained in that storage container; (c) regulating a usage rate of each ingredient of the blend mixture at the well site; and (d) creating an ingredient inventory forecast based on a total amount of each ingredient available at the well site, a total amount of each ingredient available at the remote storage facility, a total usage rate for each ingredient, a predetermined limit to the total amount of each ingredient available at the well site, and a delivery time needed to deliver a truck load of the ingredient to the on-site ingredient storage container; and (e) activating an ingredient delivery whenever an upcoming need for additional ingredient at the well is predicted by the ingredient forecast.

Yet another embodiment of the present invention is a storage management system. The storage management system includes a non-transitory computer-readable storage medium storing executable computer program instructions, the instructions executable to perform steps comprising: monitoring a level, a mass or an amount of an ingredient stored in one or more designated silos associated with a silo system; evaluating a level, a mass or an amount of a predetermined blend mixture in a blender associated with a blender system; automatically adjusting an outflow rate of the blend mixture into or out of the blender; and automatically adjusting a delivery rate of one or more ingredients from the one or more silos into the blender.

Another embodiment of the present invention is a computer-implemented method for the coordination of a blender system. The method includes the steps of: receiving instructions for monitoring and collecting information on a level, a mass or an amount of a blend mixture contained in a blender associated with the blender system; submitting the monitored information to a monitoring system, wherein the monitoring system is interlinked with the blender system; evaluating whether the level, the mass or the amount of the blend mixture is within a predetermined limit defined in a job schedule; adjusting the level, the mass or the amount of the blend mixture by submitting an adjustment request to a storage management system, wherein the storage management system is interlinked with the monitoring system and the blender system; and processing a request from the monitoring system to alter an outflow rate of the blend mixture from the blender. The method further involves interlinking a silo system with the blender system, comprising: monitoring and collecting information on the level, the mass or the amount of the ingredient in each silo associated with the silo system; submitting the collected information to the monitoring system and the management system; submitting the delivery rate of the ingredient from a designated silo into the blender to the monitoring system and the management system; and processing requests from the management system to adjust the delivery rate of the ingredient from the silo into the blender.

Other embodiments include a delivery system having: (a) a truck inventory of tractor trailers at a remote storage facility, wherein each tractor trailer contains one ingredient of the blend mixture; (b) a tractor trailer monitoring device that dynamically monitors the amount of the ingredient contained in the tractor trailer rig and a location of the tractor trailer; and (c) a required time to deliver the ingredient from the tractor trailer into the storage container. The delivery system may also be in communication with the management system and the storage container monitors wherein the management system continuously evaluates a total amount of each ingredient available at the well site, a total amount of each ingredient available at a remote storage facility, and a delivery time needed to deliver a truck load of the ingredient to the on-site ingredient storage container such that whenever the amount of the ingredient available at the well site falls outside of a predetermined limits the management system request the delivery system to select a tractor trailer from the truck inventory to deliver the ingredient to the well site.

The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. The foregoing has outlined rather broadly several aspects of the present invention in order that the detailed description of the invention that follows may be better understood.

BRIEF DESCRIPTION OF THE DRAWINGS

Appended FIGS. 1-16 depict certain non-limiting embodiments of the delivery, storage and blending system. The figures are not intended to limit the scope of the invention but, instead, are intended to provide depictions of specific embodiments, features and non-limiting characteristics of the systems described herein. The accompanying figures further illustrate the present invention. The components of an embodiment shown in the drawings are not necessarily drawn to scale, emphasis instead being placed upon clearly illustrating the principles of the present invention.

FIG. 1 depicts a modular storage and blending system having an arrangement of six silos positioned vertically on two separate base platforms with a central conveyor between the two platforms.

FIG. 2 depicts a silo in a horizontal orientation on a trailer bed positioned on a base platform.

FIG. 3 depicts a silo being raised from a trailer bed.

FIG. 4 depicts a silo in an upright vertical orientation on a base platform.

FIG. 5 depicts a free-standing silo system disengaged from a flipper mechanism and trailer bed.

FIG. 6 depicts a side view of three silos positioned in a vertical orientation on a base platform.

FIG. 7 depicts a modular storage and blending system having twelve silos where two of modular six silo storing and blending systems depicted in FIG. 1 and aligned in close proximity to each other with their central conveyors interlinked.

FIG. 8 is a schematic representation of an embodiment of the storage and blending system.

FIG. 10 is a schematic representation of an embodiment of the storage and blending system for blending two components.

FIG. 11 depicts a screen display related to the storage and blending system represented in FIG. 10.

FIG. 12 is a schematic representation of an embodiment of the storage and blending system for blending seven components.

FIG. 13 is a flowchart illustrating the information flow for the storage and blending system.

FIG. 15 is a schematic representation of an embodiment of the management system and its interaction with the delivery system, the monitoring system, the blender system and the silo system.

FIG. 16 is a schematic representation of one embodiment of the information flow among the monitoring system, the management system, the internet and/or an Ethernet, and their interaction with the delivery system, the blender system, the silo system, and authorized operators and authorized data users.

DESCRIPTION OF THE PREFERRED EMBODIMENTS

The present invention relates to a method and system for delivering, storing, and blending multi-component granular compositions such as proppant used in hydraulic fracturing in well drilling. The system includes the control and management of a delivery and on-site storage system for each of the components, the regulation of the delivery and storage of specified quantities of each component, and the regulation of the components to a blender, and the coordination of the flow of materials into and out of the blender.

Unless specifically defined herein, all technical and scientific terms used have the same meaning as commonly understood by one of ordinary skill in the art to which this invention belongs. The term "granular material" is used to define a flowable material comprising solid macroscopic particles, such as sand, gravel, or the like. The term "proppant" is used to define a granular material used in drilling, for example by oil and gas industries. Proppant comprises appropriately sized and shaped particles which may be mixed with fracturing fluid for use in a hydraulic fracturing treatment. A proppant is a material such as naturally occurring grains of sand of a predetermined size, or engineered materials, such as resin-coated sand, ceramic materials, sintered bauxite, or the like.

As used herein, the term "a programmable logic control unit or device (PLCD)" refers to any programmable computing device that includes programmable logic controllers, servers, mainframes, desktop computers, laptops, and any handheld devices such as tablets and smart phones.

As used herein, the term "about" refers to a +/−10% variation from the nominal value. It is to be understood that such a variation is always included in a given value provided herein, whether or not it is specifically referred to.

As used herein, the term "component" is used interchangeably with the term "ingredient."

Figure 8:
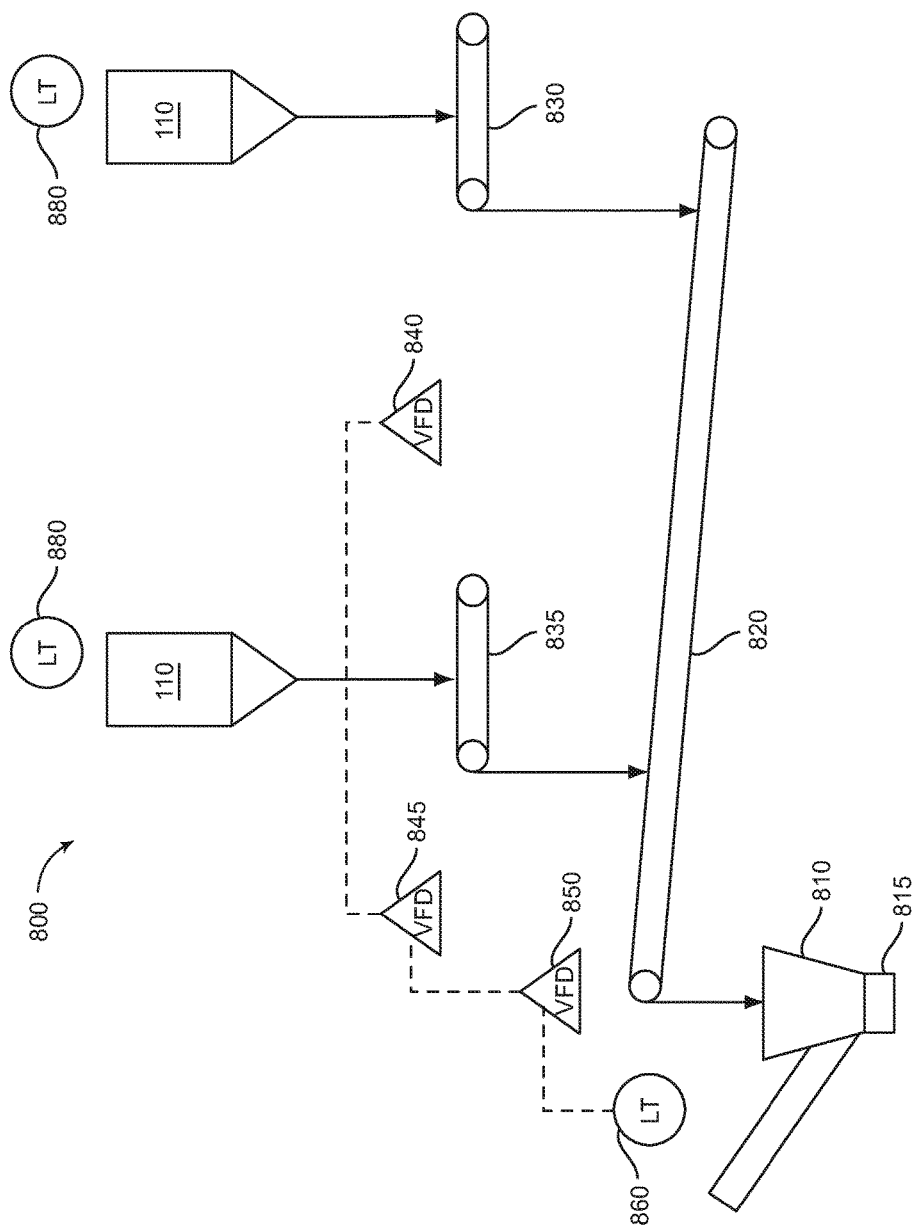
Figure 15:
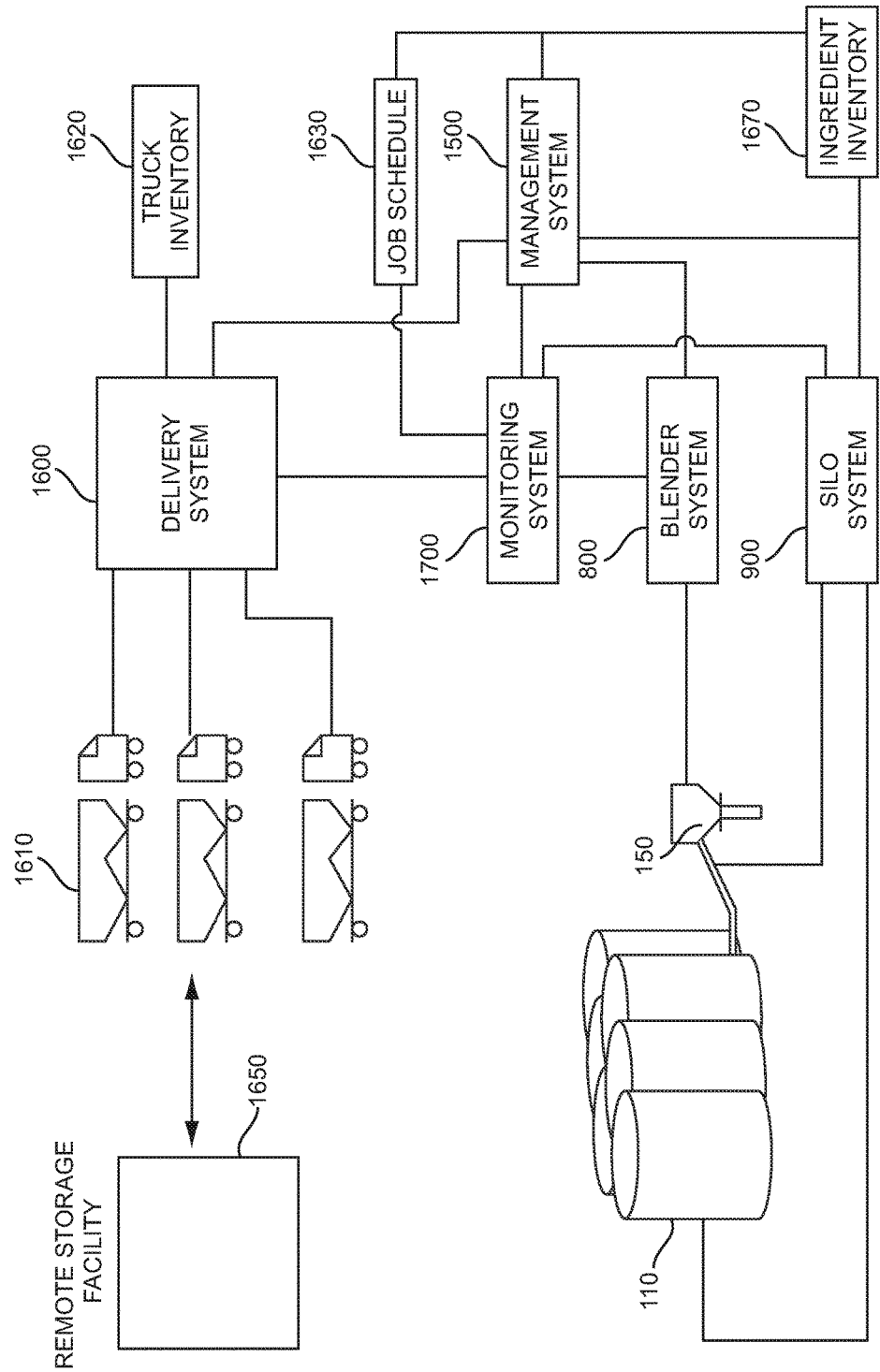
Figure 16:
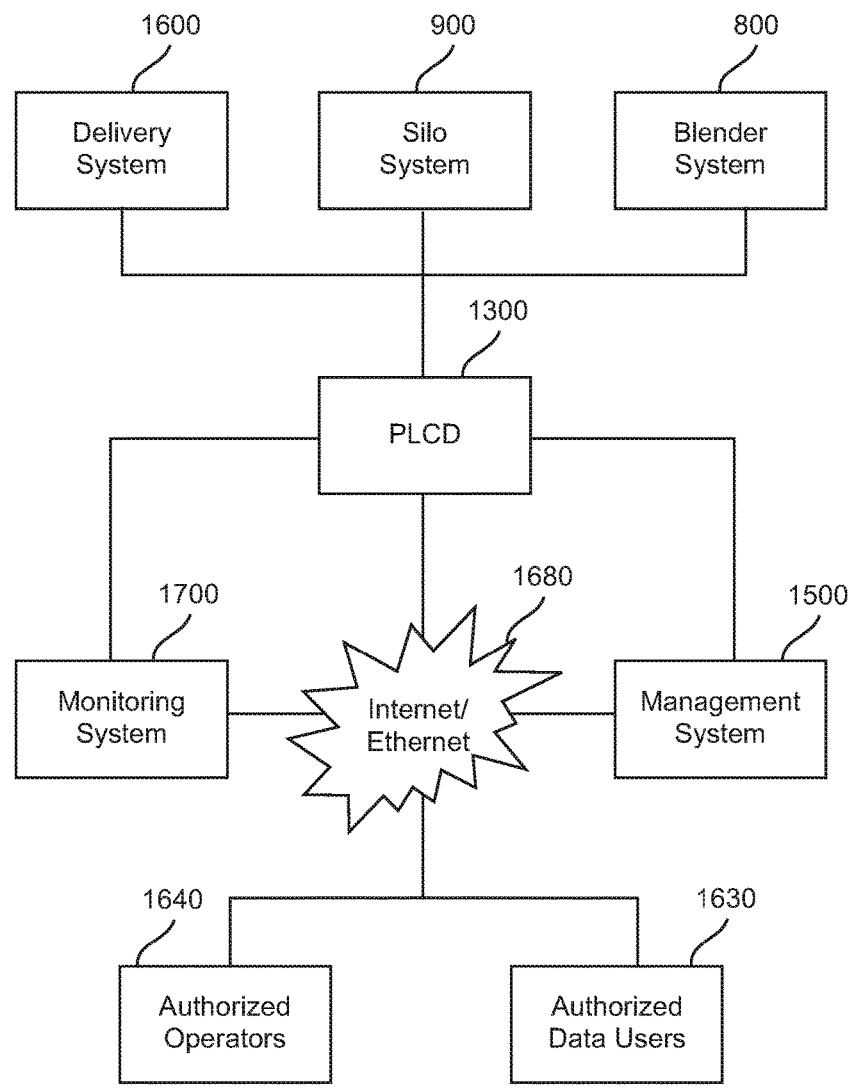

One aspect of the delivery, storage and blending system includes a coordinated management control system for a delivery system, a blender system, a silo system, and a monitoring system as described herein and shown in FIG. 15. One aspect of the delivery system is shown in FIGS. 15 and 16 and includes a fleet of tractor trailer rigs that are tracked on a delivery system and summoned when needed to maintain the necessary quantities of ingredients in the silos. One aspect of the silo system, the monitoring system and the blender system is shown in FIG. 8 and includes vertically standing storage containers for storing components or ingredients of the multi-component composition on-site, monitoring a primary feeder 820 for feeding materials into the blender 810, a lead ingredient feeder 835 for dispensing a predetermined quantity of a major ingredient of the blend mixture from a storage container 110 to the central feeder 820 and one or more secondary feeders 830 for dispensing predetermined quantities of minor ingredients from their storage container 110 to the central feeder 820.

Transport and Deployment of On-Site Storage System

Figure 1:
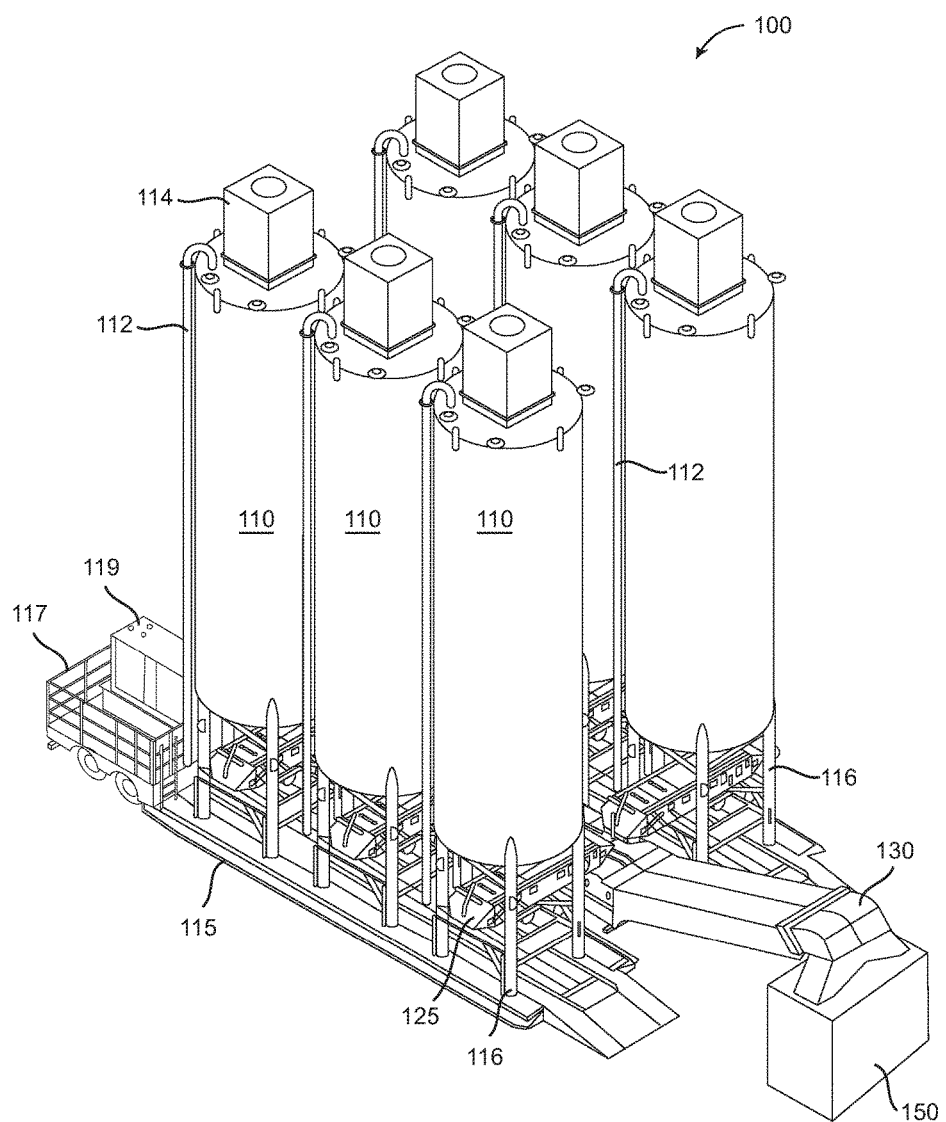

One embodiment of an on-site modular storage system 100 is shown in FIG. 1. The storage system 100 includes a plurality of mobile storage containers 110, also referred to herein as silos, arranged on a base platform 115. FIGS. 2-5 show one embodiment of transporting the storage containers 110 and deploying the containers on-site.

Figure 2:
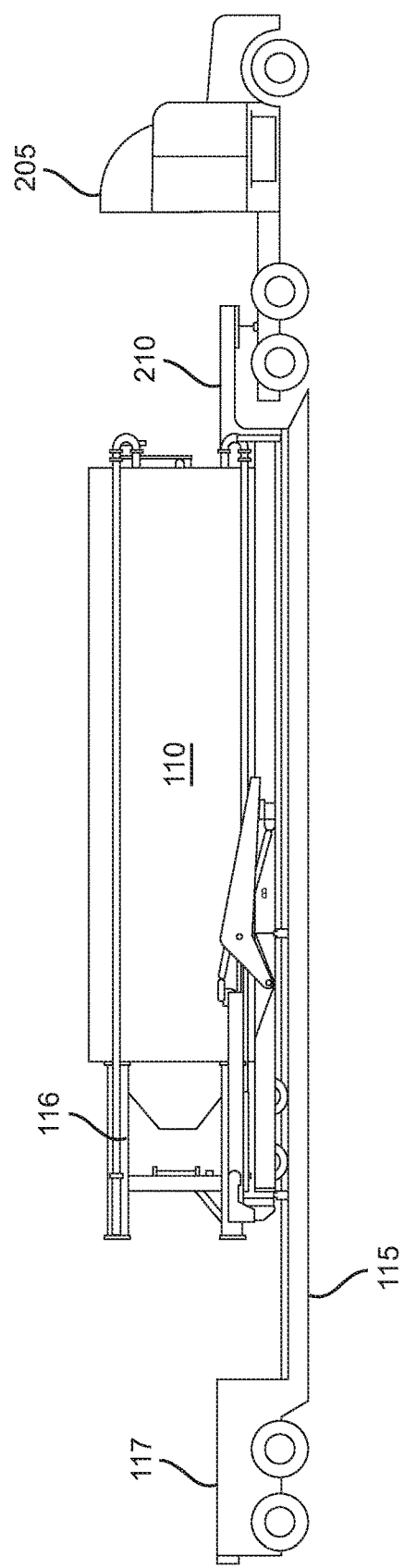

In a transportation configuration shown in FIG. 2, the silo 110 may be mounted on a trailer 210 and transported using a truck 205 to a site where the silo is to be employed. Upon arrival at the site, the truck 205 may be used to position the trailer 210 onto the surface of a base platform 115 that has been prepositioned at the site. The trailer 210, upon which is mounted a silo 110, is backed up onto the surface of a base platform 115 using a truck 205 that is coupled to the trailer. Typically, the tires of the trailer 210 are kept aligned and properly oriented via guiderails on the surface of the base platform 115. Optionally, tire stops may be employed to halt the movement of the trailer 210 at a desired position on the base platform 115. Once the trailer 210 is in a desired position on the base platform 115, the rear end of the trailer (the end of the trailer 210 furthest away from the truck 205 in FIG. 2) is raised using hydraulic jacks that may be located and attached on either side of trailer 210.

The base platform 115 serves to stabilize the silo 110 and the trailer 210 as the silo 110 is deployed into a vertical position. The base platform 115 also functions to provide stability to the silo 110 once it is in the vertical position, as well as when the silo 110 is retracted back onto the trailer 210 after deployment. The base platform 115 provides a rigid stable base for installation, operation and removal of the silos 110. Typically, one to three vertical free-standing silos may be positioned on a single base platform 115. The flat bottom base platform 115, allows a larger weight-bearing area on the ground resulting in lower ground pressure per unit weight of the silos.

Figure 3:
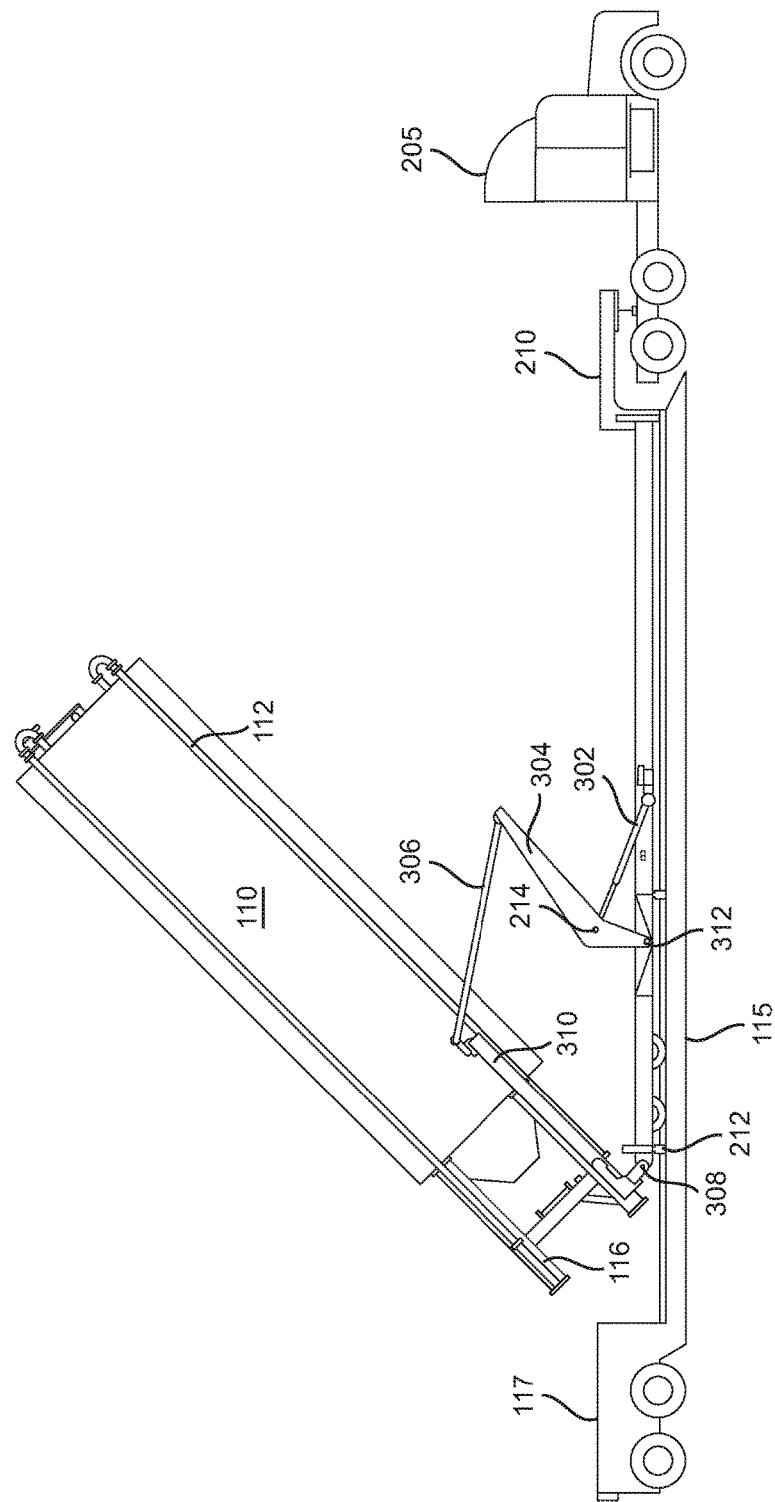
Figure 4:
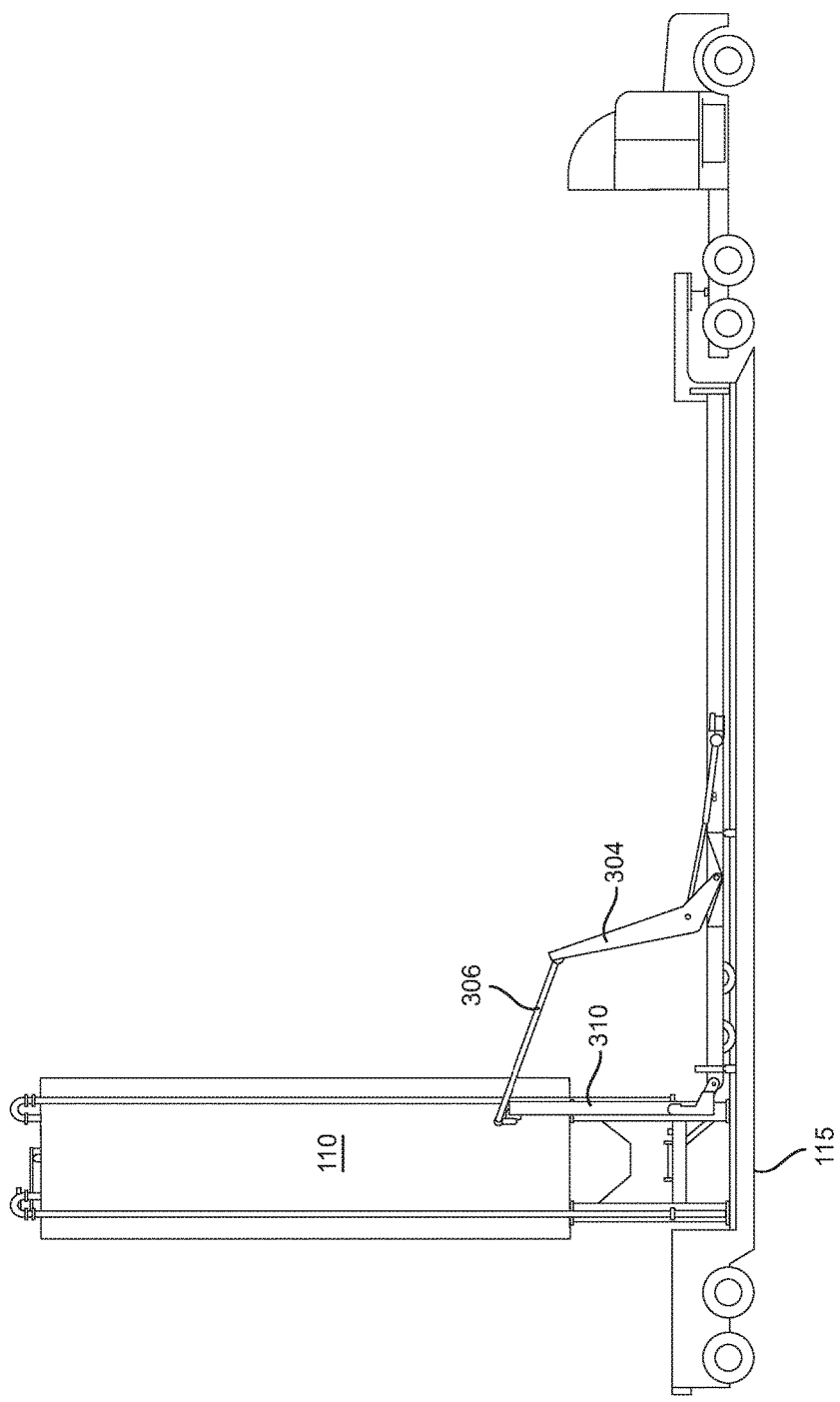
Figure 5:
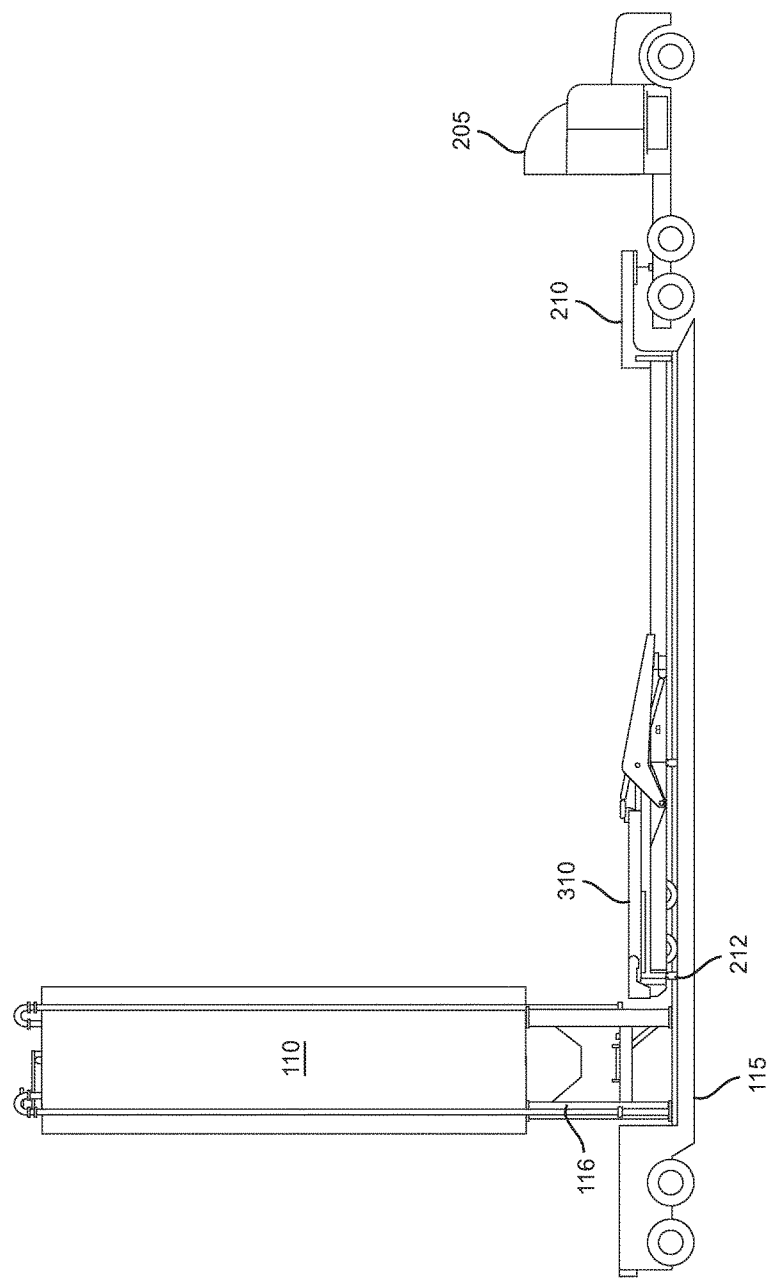

The trailer 210 has an erecting mechanism that allows for rotation of the silo during the raising or upending of the silo onto the base platform. One embodiment of the erecting mechanism is shown in FIGS. 3, 4 and 5. The erection mechanism includes a rocker arm 304 having a proximal end that is rotatably attached to the trailer 210 and a distal end attached to a flipper mechanism 310 that is adapted to be detachably coupled to a silo.

FIG. 3 depicts an actuator 302 (which in certain embodiments may be a hydraulic cylinder or rod) that is coupled to the trailer 210 and the rocker arm 304. The rocker arm 304 is rotatably coupled to the rocker arm 304 at a pin 214 and to the trailer 210 at a pin 312 which serves as a pivot point for the rocker arm 304 about which the rocker arm 304 can rotate. The rocker arm 304 is also coupled to an arm 306. Arm 306 is coupled to the flipper mechanism 310 which is in turn coupled to the silo 110. The flipper mechanism 310 is also coupled to the trailer 210 at pin 308. Pin 308 serves as a pivot point for the flipper mechanism 310 about which the flipper mechanism 310 can rotate. The silo 110 may be raised to a vertical position (or lowered to a horizontal position) by activating the actuator 302 such that the rocker arm 304 and arm 306 rotate the flipper mechanism 310 from a horizontal to a vertical position (or conversely from a vertical to a horizontal position.) The base platform 115 provides stability to the silo 110 as well as the trailer 210 during and after deployment or retraction of the silo 110.

The silo trailer 210 includes hydraulic jacks 212 at the rear of trailer which assist in the deployment of the silo 110 onto the base platform 115. The hydraulic jacks raise the trailer to allow silo clearance as the silo 110 is upended onto the base platform 115 and once the silo is raised the jacks lower the trailer 210 so that the silo legs 116 can be secured to the platform 115. Once the silo is secured to the platform, the hydraulic jacks continue to be lowered to disengage the trailer 210 from the silo 110, thereby freeing the trailer 210 and allowing the truck 205 to tow it away.

FIG. 4 depicts the silo 110 in a fully vertical position but still coupled to the flipper mechanism 310 which is in turn coupled to arm 306 and the rocker arm 304, while FIG. 5 depicts a configuration in which the silo 110 is free standing and disengaged from the flipper mechanism 310 and the flipper mechanism has been fully retracted.

Figure 6:
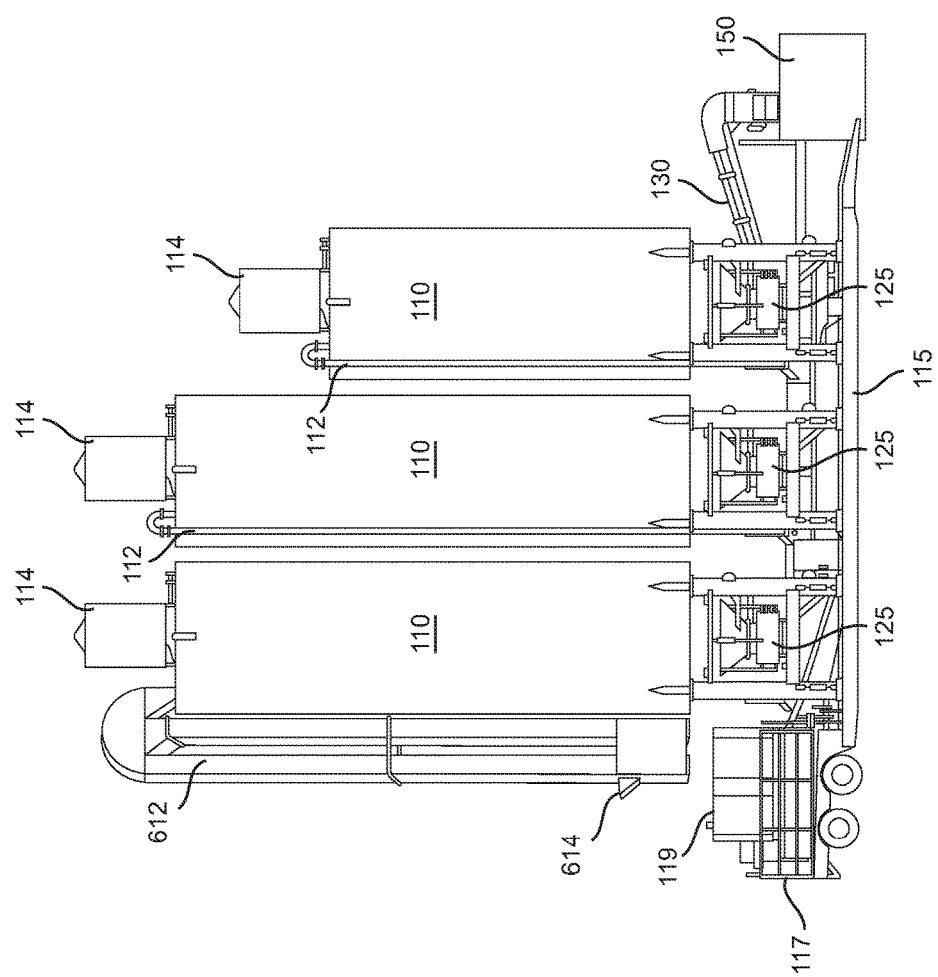

FIG. 6 illustrates a side view of a base platform 115 with three vertically standing silos 110 with their legs 116 secured to the base platform 115. The platform 115 typically has an operational section 117 with an attached power generator 119. A power distribution center is included for distribution of power to the one to three silos positioned on a base platform 115 with preinstalled hardware to operate a second base platform 115. The base platform and its associated operational section 117, with a set of wheels positioned under the operational section, may be transported from one location to another as though it were a trailer by attaching it to a tractor for relocation.

Managing the Content of the Silos at the Site

A preferred embodiment of an on-site modular storage system 100 is shown in FIG. 1. The illustrated embodiment of the modular storage system 100 includes six silos 110, also referred to as storage containers, arranged as two approximately parallel rows of three silos. Each line of three silos are secured to a base platform 115 with an operational section 117 at one end of each platform. A generator or power system 119 allows for the self contained operation of the storage and blending system 100.

One embodiment of the modular storage system 100 includes silos of different shapes and sizes. For example, the silos 110 shown is FIG. 6 include two different sizes of silos. In certain embodiments, smaller silos can be an advantage if one of the components for a specific blend is to be added in trace amounts.

Figure 7:
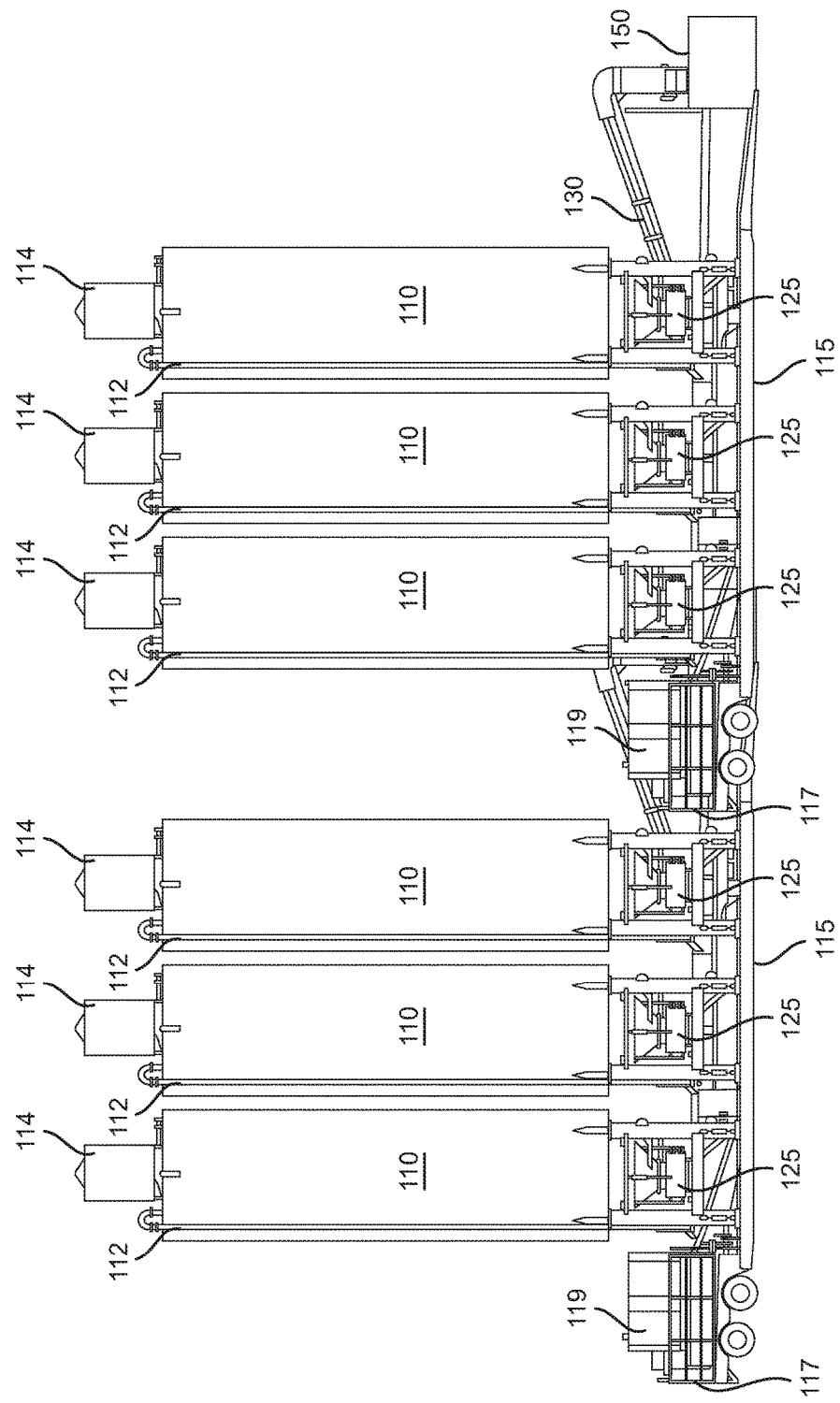

Using the modular storage system 100, the storage and blending system can be expanded in a modular fashion to include additional silos. This modular expansion system allows the user to expand the volume of storage for each component (also referred to herein as an ingredient) of a multi-component composition (also referred to herein as a blend mixture). For example, each modular storage system 100 added provides an additional six silos for storage. Since each silo provides a separate storage compartment, the user can house a different component or ingredient in each silo. Alternatively, for storing large quantities of a component, such as proppant for a fracking job, then each additional six silos greatly increases the on-site storage of a component. For example, if the user is storing proppant on-site an additional six silos provides about 2,500,000 pounds of additional proppant storage, or a twelve silo system (as illustrated in FIG. 7) enables the pressure pumper to preload about 5,000,000 pounds of proppant or nominally one hundred over-the-road truckloads. This gives the pressure pumper a competitive advantage in that it eliminates potential delay and demurrage costs by allowing a large on-site inventory of proppant that is immediately available for use.

The silos 110 may contain one or more devices for monitoring the level of their contents. The monitoring devices may be sonic, radar, optical, inductive or mechanical level monitors. Measuring the contents is useful for inventory management, determining and controlling the rate of usage, and avoiding over filling or unexpected empty conditions as shown in FIG. 9A and described in more detail below.

For example, load cells or strain gauges attached to the silo legs 116 may be used to weigh the contents of the silo. Another example of a monitoring device is a pulsed radar monitor positioned inside a silo 110 at the top portion of the silo. The pulsed radar on the top of the silo is used to detect the profile of the granular component in the silo, as it takes the angle of repose of the component into consideration and calculates an effective level, or weight, of the component in the silo.

Figure 9A:
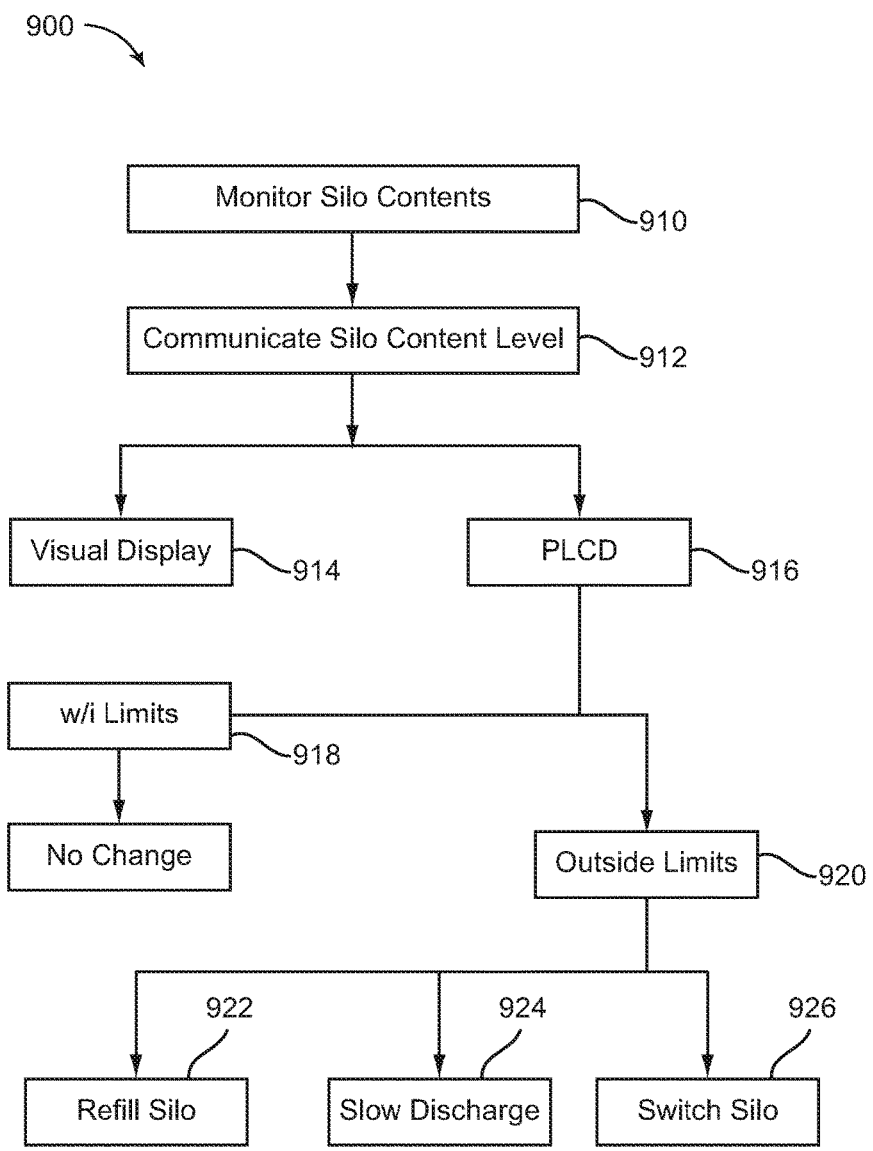
FIG. 9A is a flowchart illustrating a process for monitoring the content levels within the silos.

As indicated in FIG. 9A, the silo content level may be transmitted by a level transmitter to a programmable logic control unit or device (PLCD 916) for visual display 914 and/or to a human machine interface that is visible to the on-site operator, who can control the content level of the silo through a PLCD 916 either by slowing the discharge of component 924 from the silo, switching to another silo for discharging that component 926, or start refilling the silo 922 with that component. Embodiments of the PLCD include programmable logic controllers, servers, mainframes, desktop computers, laptops, and any handheld devices such as tablets and smart phones.

Preferred embodiments determine real time variations in the level, volume or weight of the contents of the silos and transmit the level of component in the silo to the PLCD 916 that is programmed to automatically slow or stop the outflow of component from a particular silo at a pre-determined level, switch silo flows to ensure the uninterrupted flow of the component, or initiate the refilling of the silo to maintain the silo level of component within predetermined limits. This PLCD-based monitoring and automatic operation removes the need to have visual monitoring of each silo or storage container, thereby reducing the number of personnel required at a given site location.

One embodiment of a digitally communicated silo monitoring system presents all real-time consumption trends and operating parameters via mobile devices, including laptops, tablets and smart phones. This monitoring system enables everyone associated with the on-site operation, such as field operators and on-site employees as well as representatives of component supply companies, to monitor the progress and efficiency of the management of the on-site inventory of multiple components needed at various stages of an operation.

As illustrated in FIG. 15, the PLCD 1300 is in constant communication and shares information and data with the monitoring system, the management system, the delivery system, the silo system and the blender system. The software integral to the operation of the monitoring system and the storage management system orchestrates the activation, deactivation, and cooperation of the various on-site and off-site components of the system.

Typically, one of the first steps required by the software is to assign certain designations to the silos at a particular site operation. These designations are used to segment the data by location (with a GPS identification) so that the software can recognize authorized users of the site information and data. For example, a six-pack configuration of two bases and six silos as shown in FIG. 1 might be assigned a fleet (FLT) number with each base platform having a combination of three silos at a given location assigned a fleet number such as FLT 13A and FLT 13B.

One of the next steps will be to enter identifiers of authorized users, what information and data is accessible to each authorized user and whether that individual can input data into the software, modify data in the software, or has a read only clearance. Generally, authorized users will fall into different categories with access to different data. For example, all on-site operation personnel may have access to all the raw field data, the calculated data, and the logged historical data over the time of that particular site operation. Another example, might be the employees or administrators of a service company or component supplier. Like the on-site operation personnel, the service provider personnel may have access to all the raw field data, the calculated data, and the logged historical data over the time of that particular site operation; however, the service provider personnel may also have access to the delivery system information such as the inventory of tractor trailers, ingredient supplies and delivery schedules.

Personnel that creates the various lists of authorized users will be given "create" permission to add, edit, and delete authorized users from a particular list. Other users will the given "view" or "read only" permissions. Each authorized user may be given a secure user number that when entered into a secure website will automatically route that user to only the material that that particular authorized user can create and/or view. Otherwise whenever a user signs in, the user can enter specifics such as the customer name and/or fleet number to be granted access to the site data and information.

Figure 14A:
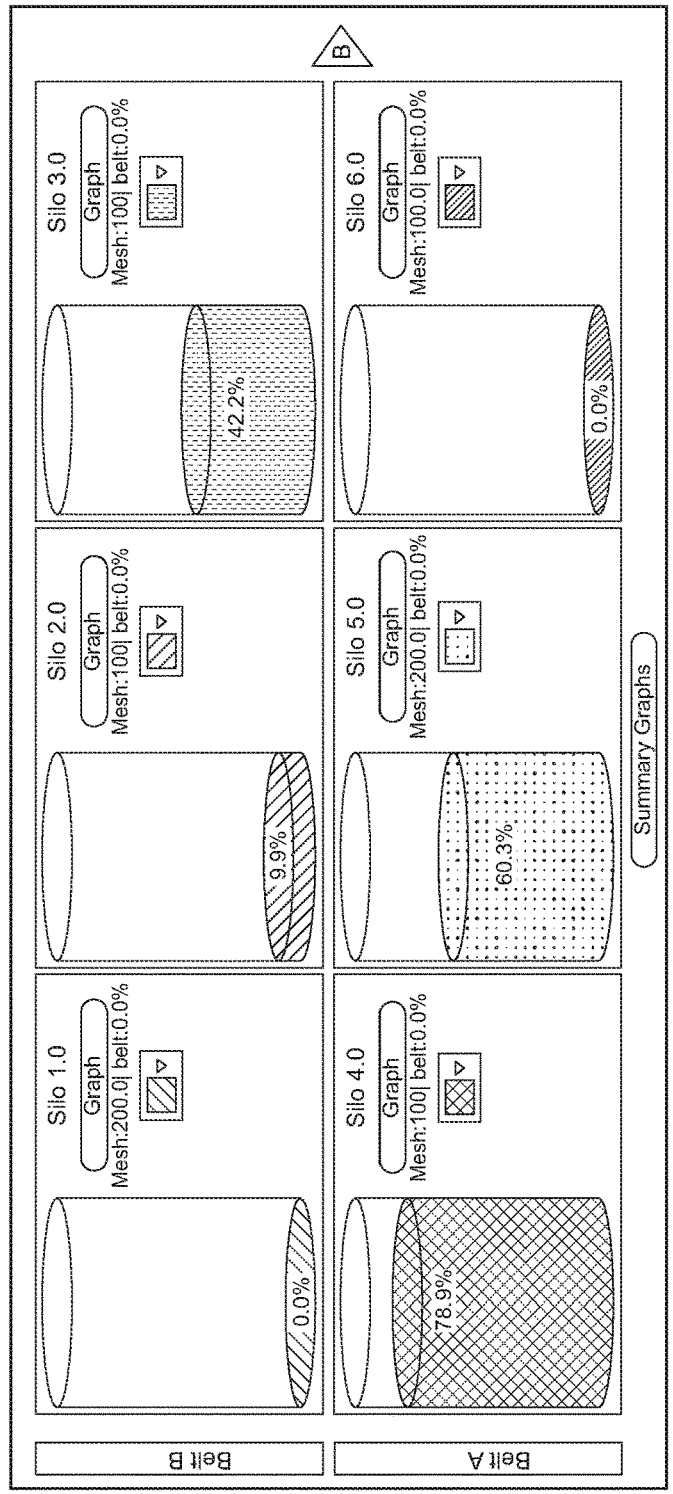
FIG. 14A depicts one embodiment of a screen display related to monitoring the content levels within each silo.

FIG. 14A depicts one embodiment of a screen display related to monitoring the content levels within each silo of a six-pack at a particular site location. In the example illustrated, a fleet number such as FLT013 is assigned to the six silos. The silos are illustrated and numbered as they are positioned relative to a blender or container that the components are being discharged into. A graphic representation of each silo is shown with a content level indicated on each silo depiction. Adjacent the graphic representation for each silo is a area marked graph. If the "graph" designation is activated then a graph for the component usage for that silo's component is displayed over a specified time period.

Figure 14B:
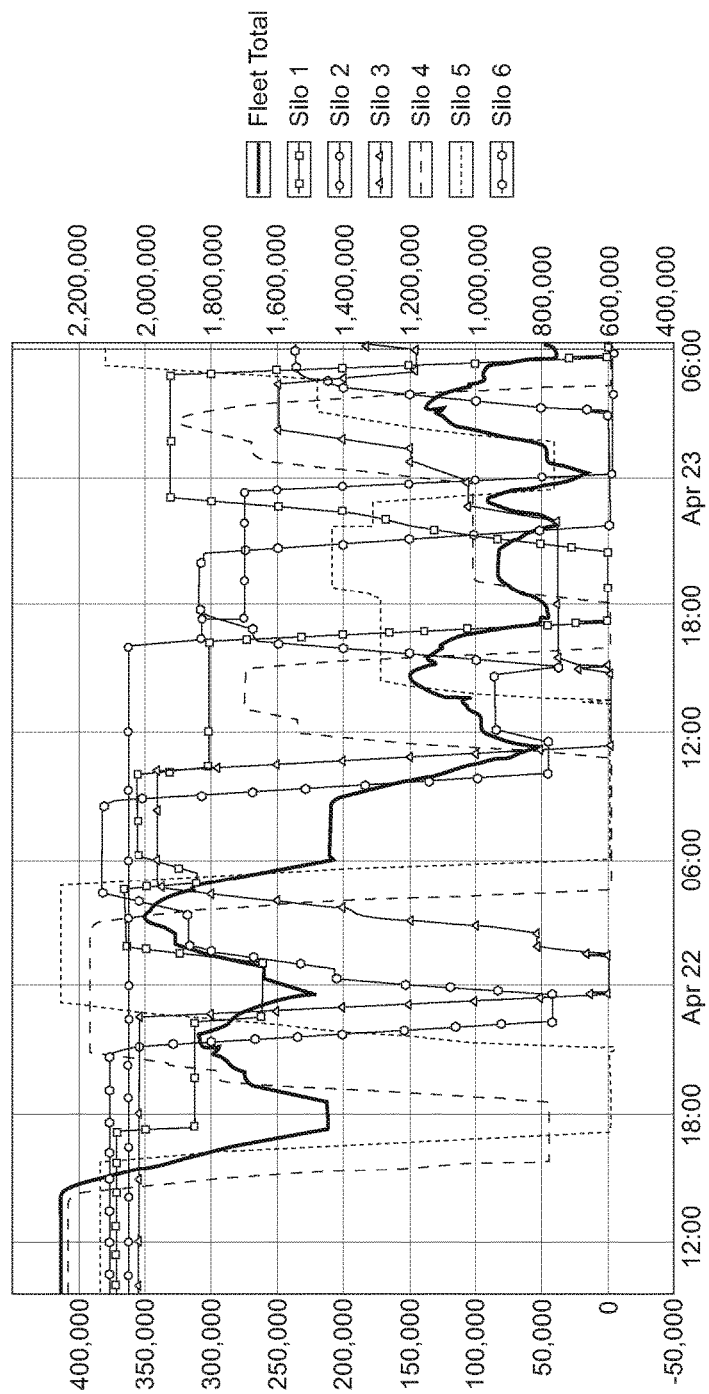
FIG. 14B depicts one embodiment of a screen display related to the history of component usage from and input into each silo over a specified time period.

FIG. 14B depicts one embodiment of a screen display related to the history of component usage from and input into each silo of the six pack shown in FIG. 14A over a specified period of time. The user can designate a color to the component usage graph of a particular silo, or may select to view one graph at a time.

The regulation of the outflow of the component or ingredient from a silo is typically automated as illustrated in FIG. 9A. Controlling the inflow of component, or refilling of the silo, may be performed during the operation of the blending system. The silos 110 typically have one or more fill tubes 112 or bucket elevators 612 running up the side of the silo. The tubes 112 or bucket elevators 612 facilitate loading the granular component into the silo. A loading system such as a blower, an in-feed elevator, conveyor, bucket elevator, or the like, is operatively incorporated into fill tube 112.

One embodiment of the loading system is a pneumatic blower system. The silo is filled by the component supplier's truck and driver. The driver positions the pneumatic trailer into position and attaches a hose to the fill tube(s) on the exterior of the silo. The driver then adjusts valves on the blower to move the component or ingredient from the truck into the silo.

Another embodiment of the loading system is a bucket elevator 612 used to deliver material loaded in the elevator boot 614 into the top of the silos. A bucket elevator system can be incorporated inside of a large fill tube on the exterior of a silo, or the bucket elevator system 612 may be a different system attached to the silo 110 instead of or in addition to the fill tube 112. One embodiment of a bucket elevator attached to a silo is illustrated for the silo 110 shown on the far left-side of FIG. 6.

In preferred embodiments, each silo 110 of the modular storage system 100 is equipped with a vent at the top or side of the silo 110 to prevent the accumulation of excessive pressure inside the silo 110. For example, each silo may be equipped with a bin vent style dust filtration unit 114 on top of the silo. Each dust filtration unit 114 is sized to accommodate up to four pneumatic trailers filling an individual silo with a granular component such as sand. The dust filtration unit significantly reduces the presence of free-floating dust on location; particularly the health hazards associated with the large amount of silica dust associated with filling one or more silos with sand. The dust filtration unit 114 may be a self-cleaning unit that recycles the dust back into the silo rather than releasing it into the environment.

FIG. 9A is a flowchart illustrating a process for controlling the content level of components in the one or more silos in which the components are stored. This process is also referred herein as a silo system 900 that communicates with the coordinated monitoring system 1700 and management system 1500 shown in FIG. 15. In certain embodiments, the process may be a computer-implemented process (e.g., executable on an electronic control unit or PLCD). The electronic control system or PLCD may implement the process by acquiring real-time operational data from the silo level monitors, evaluating the data against stored predetermined component content limits, minimal and maximal limits, and outputting appropriate control signals in the system.

As illustrated in FIG. 9A, the process includes the step of continually monitoring the silo contents level using silo monitors (block 910). The silo levels are communicated (block 912) to a visual display (block 914) and/or to a programmable logic control device (PLCD) (block 916). Thus, the PLCD constantly acquires real-time silo content level data from the silo level monitors, evaluates the data against stored predetermined component content limits, minimal and maximal limits, and outputs appropriate control signals in the system. If the content level data is within the programmed prescribed limits (block 918) then the PLCD will not initiate any change in the blending system. If on the other hand, the silo level contents pass outside of the prescribed limits (block 920), then the PLCD sends an alert to the silo technician and/or the system operator. The silo technician or the system operator is responsible for ensuring that the situation is addressed either manually by the silo technician or as instructed by the PLCD to initiate refilling the silo (block 922), slowing the discharge from the silo (block 924) by instructing the variable frequency drives (VFDs) of the primary, lead and secondary feeders to slow, or to automatically turn off the lead or secondary feeder from the silo with a content level outside of the prescribed limits and to activate the discharge of that component from another silo (block 926).

Managing Inflow/Outflow of Blend Materials to the Blender

A schematic of one embodiment of the blending system for a two component blend mixture as described herein is shown in FIG. 8. This embodiment includes multiple vertically standing storage containers for storing ingredients of the blend mixture on-site, a primary feeder 820 for feeding the ingredients into the blender 810, a lead ingredient feeder 835 for dispensing a predetermined quantity of a major ingredient from a storage container 110 to the primary feeder 820, one or more secondary feeders 830 for dispensing predetermined quantities of minor ingredients from their storage containers 110 to the primary feeder 820.

Figure 9B:
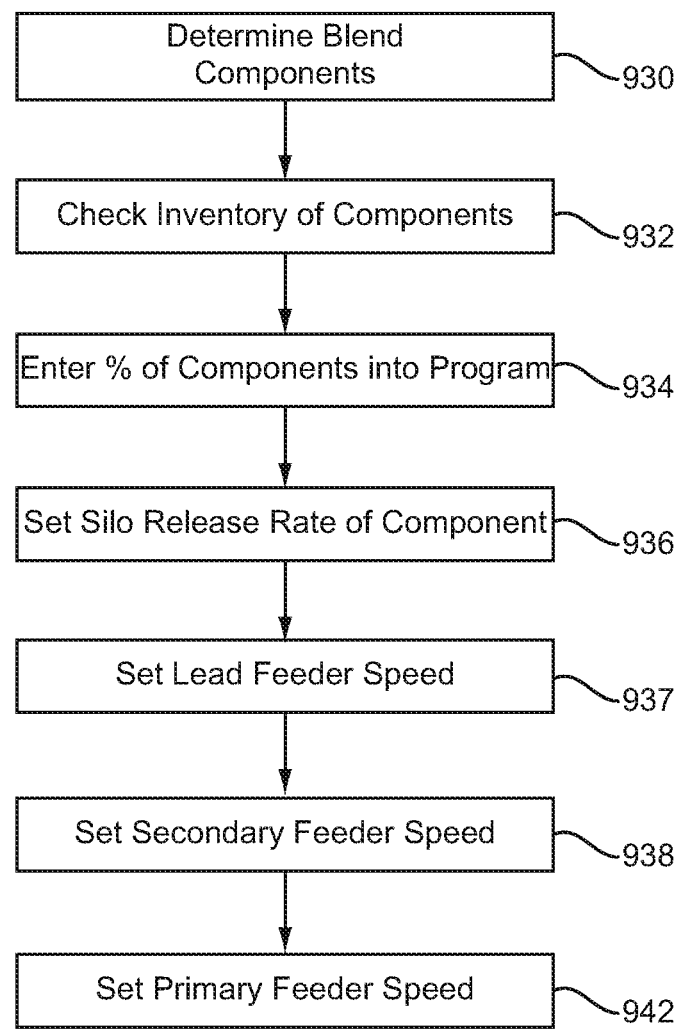
FIG. 9B is a flowchart illustrating a process for controlling the blending of multiple components of a blend mixture.
Figure 9C:
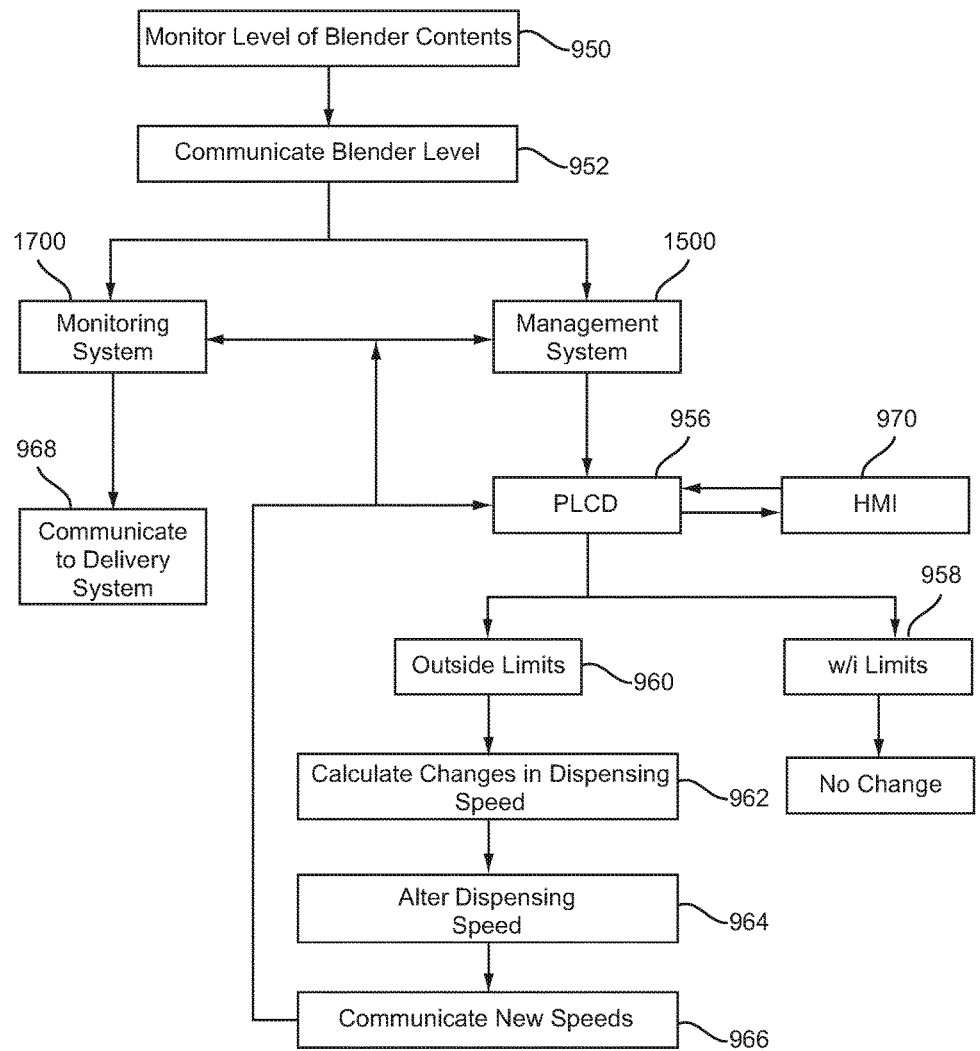
FIG. 9C is a flowchart illustrating a process for controlling the blending process based on the level of the contents within the blender.

One aspect of the coordination of the blender system 800 of FIG. 8, the monitoring system 1700 and the management system 1500 is outlined in FIG. 9C. The blender monitor 860 continually monitors the level/mass/amount of blend mixture in the blender (block 950). The level of the blend mixture in the blender is communicated to the monitoring system 1700 and the management system 1500 (block 952). The management system 1500, through the use of the PLCD (block 956) determines the amount of the blend mixture in the blender and compares that amount to the desired amount of blend mixture within a predetermined limit. If the amount of blend mixture is within the predetermined limits (block 958) then the blending system continues unchanged; however, if the amount of blend mixture falls outside of the predetermined limits (block 960) the management system calculates the adjustment necessary in the dispensing speed (block 962) of the ingredients of the blend mixture to bring the amount of the blend mixture in the blender back within the predetermined limits and instructs the PLCD to alter the dispensing speed of the primary, lead and secondary feeders. The management system alters the delivery rate of the blend ingredients by instructing the PLCD to instruct the VFD 850 of the motor that runs the primary feeder 820, the VFD 845 of the motor that runs the lead ingredient feeder 835 and the one or more VFDs 840 of the motors that run the one or more secondary feeders 830 to alter their speed in response to the command from the management system (block 964). The management system communicates the altered delivery rate to the PLCD, the management system, and the monitoring system (block 966) and the monitoring system modifies the conveyor speeds displayed on the HMI (block 970) and/or on one or more PLCDs. The monitoring system 1700 also communicates all changes in component or ingredient use to the delivery system (block 968).

The feed rate of the primary feeder 820 is controlled by a feeder regulator 850, the feed rate of the lead feeder 835 is controlled by a feeder regulator 845, and the feed rate of the secondary feeder 830 is controlled by a feeder regulator 840. A level monitor 860 tracks the level of material in the blender 810 or the amount of material entering the blender 810, wherein the level of material in the blender is controlled by controlling the inflow of blend materials into the blender and the outflow of the blended material out of the blender. The inflow of the blend materials into the blender is controlled by the feed rate of the primary 820, the lead 835 and the secondary feeders 830 and the amount of material exiting the blender 810 is controlled by a outflow regulator 815 such as an auger or a pump. The system, either in whole or in part, can be controlled either manually or electronically.

The coordination of the on-site silo system 900 and blending system 800 allows oil field personnel to blend two or more products with precision. This enables pressure pumpers to precisely blend products for specific well designs that call for a blend of proppants such as a coated sand of a specific color with another proppant, a sand that is chemically coated with a traceable tag to allow the proppant to be traced down hole, or a blend of proppant and other bulk solid additives for tracking proppant position or performance. For example, the readings of the level monitor 860 can be used to calculate the level/mass/amount of the blend mixture contained in the blender at any given time and communicated to the monitoring system 1700 and the management system 1500. The calculated level/mass/amount of blend mixture in the blender 810 is evaluated to determine if it falls within predetermined limits that fit within the overall requirements of the blend mixture for the job schedule.

FIG. 6 depicts one embodiment of three silos 110 positioned side-by-side on a base platform 115. Also depicted are shuttle conveyors 125 which are located under the exit ports beneath each silo 110 such that the shuttle conveyor 125 may be used to transfer material stored in one or more silos 110 onto a dual belt conveyor 130 or other receiving mechanism that delivers the material to a container, hopper or blender hopper 150.

FIG. 1 depicts six silos 110 vertically positioned on two separate neighboring base platforms 115 in a "six pack" configuration 100. In between the two rows of three silos is a central conveyor system 130, or primary feeder 820, that is fed by the shuttle conveyors 125, serving as lead or secondary feeders 830, 835 beneath each silo. The speed of the central conveyor system 130 as well as the shuttle conveyors 125 may be electronically controlled using variable frequency drives that allows for the remote control of variations in the speeds of the conveyors. The central conveyor system 130 is used to transport the material stored in the silos 110 into a container, storage bin, hopper or blender hopper 150. Any number of silos can be employed at the site by adding additional six pack configurations such as illustrated in FIG. 7.

In preferred embodiments, the blending system 800 illustrated in FIG. 8 is designed to maintain a constant level and supply of component (which is adjustable) from the one or more silos to the blender 810 that feeds an on-site operation, such as a frac job. Since the system is designed to monitor granular solids or proppant amounts in real time, the system can furnish the rate at which one or more components are being removed from one or more silos, as well as the rate of ingredient delivery into the blender originating from the one or more silos.

In order to maintain an efficient on-site operation, it is necessary to control the rate that the blended composition, or proppant, is being removed from the blender and to balance that exit rate with the rate that the various components are being delivered to the blender. The exit rate of the blended material may controlled by a variety of regulatable dispensers. Basically, the same process can be used to control the exit rate of the blended material from the blender as is used to control the entry rate of the blend ingredients into the blender as shown in FIG. 9C. For example, augers, discharge chutes, vibratory dispensers, pumps or conveyors having adjustable speeds can provide a regulatable feed rate from zero to a predetermined maximum flow of the blended material from the blender. Regulatable blender control devices such as an auger use a machine to run the blender control device 815. Thus the exit rate of the blended material from the blender can be adjusted by adjusting the variable frequency drive (VFD) of the motor used to run the blender control device. If an auger is used to dispense the blender material from the blender, then the speed of the motor that turns the auger controls the exit rate of the blended material from the blender. If the management system 1500 determines that the level of the blended materials in the blender is outside the predetermined limits (block 960) then the management system calculates the adjustment necessary in the dispensing speed (block 962) of the blend mixture from the blender needed to bring the amount of the blend mixture in the blender back within the predetermined limits. The management system then instructs the PLCD to alter the dispensing speed of the blender control device by instructing the VFD of the motor that runs the blender control device 815 to alter its speed in response to the command from the management system (block 964). The management system communicates the altered blender exit rate to the monitoring system (block 966) and the monitoring system modifies the blender exit rate as displayed on one or more computing devices (PLCDs). The monitoring system also communicates all changes in the blend component usage to the delivery system.

In a frac job, for example, a large amount of the blended proppant is continuously being pumped into the well from the blender so in order that the frac job is not interrupted due to the unavailability of the blended proppant, the rate at which each component of the blended proppant is released from the silos and delivered into the blender and out of the blender must be carefully regulated. In certain embodiments, flow of components from each silo is controlled using detectors and is automated by a programmable logic control device (PLCD).

The central or primary feeder 820, the lead ingredient feeder 835, and the secondary feeders 830 may be a variety of regulatable dispensers. For example, discharge chutes, gate valves, vibratory dispensers, augers or conveyors having adjustable speeds that can provide a regulatable feed rate from zero to a predetermined maximum flow of a particular component from a silo.

Conveyors, such as the central conveyor or shuttle conveyors described above, serve as preferred primary and secondary feeders since they move material, such as sand or other solid granular material, horizontally. This allows a lower overall installed height than using conventional inclined chutes or augers. Variable frequency drives are optionally installed to allow control of the speed of the shuttle and central conveyors and thus the component feed rate.

Shuttle conveyors 125 are preferred secondary and lead feeders 830, 835. The shuttle conveyor is reversible to allow discharging material from either side of the silo. As illustrated in FIG. 1, a shuttle conveyor 125 is typically positioned below each silo 110 on the base platform 115. The speed of the conveyor is remotely controlled via a digital electronic system, providing precise control of the discharge rate to match the required flow of the site operation.

A preferred embodiment of the primary or central feeder 820 is a dual belt conveyor 130. The dual belt conveyor and the shuttle conveyors typically have variable frequency drives (VFD) or other feeder regulators. As shown in FIGS. 1 and 8, one or more shuttle conveyors 125 (the secondary and lead feeders 830, 835 respectively) can feed components onto the central conveyor 130 (the primary feeder 820). The gentle transitions of the components from the shuttle conveyors to the dual belt conveyor limit the sifting segregation of the blend materials as they are dispensed from the silos 110 to the blender 150. A thorough mixing of all of the blend materials or components is performed downstream in the blender 150 where liquid is added before the blended materials are typically removed from the blender by pumping the blended materials into a well site.

The quantity of each blend component dispensed from a silo 110 to a secondary or lead feeder 830, 835 and to the primary or central feeder 820 is controlled by regulating the feeder regulator 840 of the secondary feeder 830, the regulator 845 of the lead feeder 835 and the feeder regulator 850 of the primary or central feeder 820 in order to increase or slow their output speeds. The level of blend material in the blender 810 is used to balance the inflow and the outflow of the material in the blender. Thus, the level of material in the blender is important and is continuously monitored either by a designated operator or automatically by a level monitor 860 positioned at the end of the primary feeder to monitor the level of material in the blender or to monitor the quantity of material that drops into the blender.

The blender level monitor 860 may be a sonic, radar, optical, inductive or mechanical level monitor. Preferred embodiments use a level sensing laser, a guided wave radar, a non-contact radar, or a pulsed radar device to constantly monitor the level of material in the blender. The monitoring device or level transmitter will communicate the blender level to the monitoring system and to the management system. The management system adjust the speed of the feeder regulators on the secondary, lead and primary feeders in order to increase or slow their speeds so that the level of material in the blender is adjusted and controlled. Similarly, the level of blend material in the blender can also be controlled by adjusting the speed of the outflow of blended material by adjusting the speed of the blender control device 815. This system can be wireless or Ethernet cable connected.

In certain embodiments, the storage and blending process may be a computer-implemented process (e.g., executable on the electronic control system or PLCD). The electronic control system or PLCD may implement the process by acquiring real-time operational data from the blender level transmitter 860, evaluating the quantity of component outflow from the blender and balancing the rate of inflow of components into the blender with the rate of outflow of the blended mixture from the blender 810. This balancing on inflow and outflow is achieved by controlling the dispensing of each component into the blender by the feedback regulation of the speed of dissemination of each component from a silo within certain predetermined limits and outputting appropriate control signals to the VFDs of the primary and secondary feeders to speed up, slow down or stop the speed of the feeders and therefore the rate of dispensing of the components into the blender to match the outflow of the components from the blender. The rate of outflow of the blended components from the blender can also be increased, slowed down or stopped by controlling the removal rate from the blender. The electronic control system or PLCD can control the blender outflow rate according to the weight of material in the blender or by setting predetermined limits on the level of material in the blender.

As illustrated in FIG. 9B, the process includes the step of determining the desired blend of components (block 930). Checking the on-site inventory (block 932) to ensure that sufficient quantities of each component in the multiple component blend is either on-site or within an area close enough to reach the site in time to fulfill the quantities needed to complete the on-site operation.

The calculated proportion of the desired blend components is entered into the data residing on the PLCD (block 934) and used to program the rate of release of each component from the silo containing that component (block 936). The release rate of each component is used to calculate the desired feeder rate to provide the desired rate of dispensing that component from the appropriate silo. The PLCD then instructs the setting of the VFD 845 to set the lead feeder speed (block 937) and the VFD 840 to set the secondary feeder speed (block 938) to the calculated feeder rate. The PLCD also calculates the desired delivery speed of the components into the blender 810 and instructs the automatic setting of the VFD 850 of the primary feeder 820 to run the primary feeder at the desired speed (block 942).

As shown in FIG. 9C, the blender level monitor and transmitter 860 continuously monitors the level of material in the blender (bloc 950) and continuously communicates the material level in the blender to the monitoring system, the management system and the PLCD (bloc 952). Thus, the PLCD constantly acquires real-time blender material level data from the blender level monitor 860. The PLCD may display this information on any PLCD visual display and/or on the human machine interface (bloc 970) connected to the PLCD (bloc 956).

The PLCD will evaluate the acquired blender level data against stored predetermined allowable limits on the level of the blender contents. If the level of the blender contents is within the prescribed limits (bloc 958) then no adjustment of the component dispensing speed is necessary. However, if the level of blender contents is above or below the prescribed limits (bloc 960), then the PLCD will immediately calculate the desired changes in the dispensing speed of each component and/or the rate of outflow of the blended material from the blender (bloc 962) and instruct the speed regulator of the dispenser of each component to alter the dispensing speed of each component to the desired speed and/or instruct the blender control device to alter the exit rate of the blended material from the blender (bloc 964) so that the inflow of components into the blender is carefully controlled. Any changes to the dispensing speed of a component or of the blended material is then communicated to the PLCD, the management system, and the monitoring system (bloc 966) which then communicates those changes to any visual display of the speeds and to the delivery system.

One embodiment of the blending and storage system includes a single or group of small, modular storage vessels that could be physically installed on top of the primary feeder or central conveyor. In some cases a bulk solid chemical may have a very low dose rate and requires a much smaller inventory than the typical full size silo. In this embodiment, the small bulk tank(s) would typically utilize a dispenser such as a small volumetric screw conveyor, a small vibratory feeder or shuttle conveyor to discharge its contents to the primary feeder. The PLCD would regulate the discharge rate of these small storage vessels by regulating the motor speed of the dispenser.

An Example of a Two Component Blend

Figure 10:
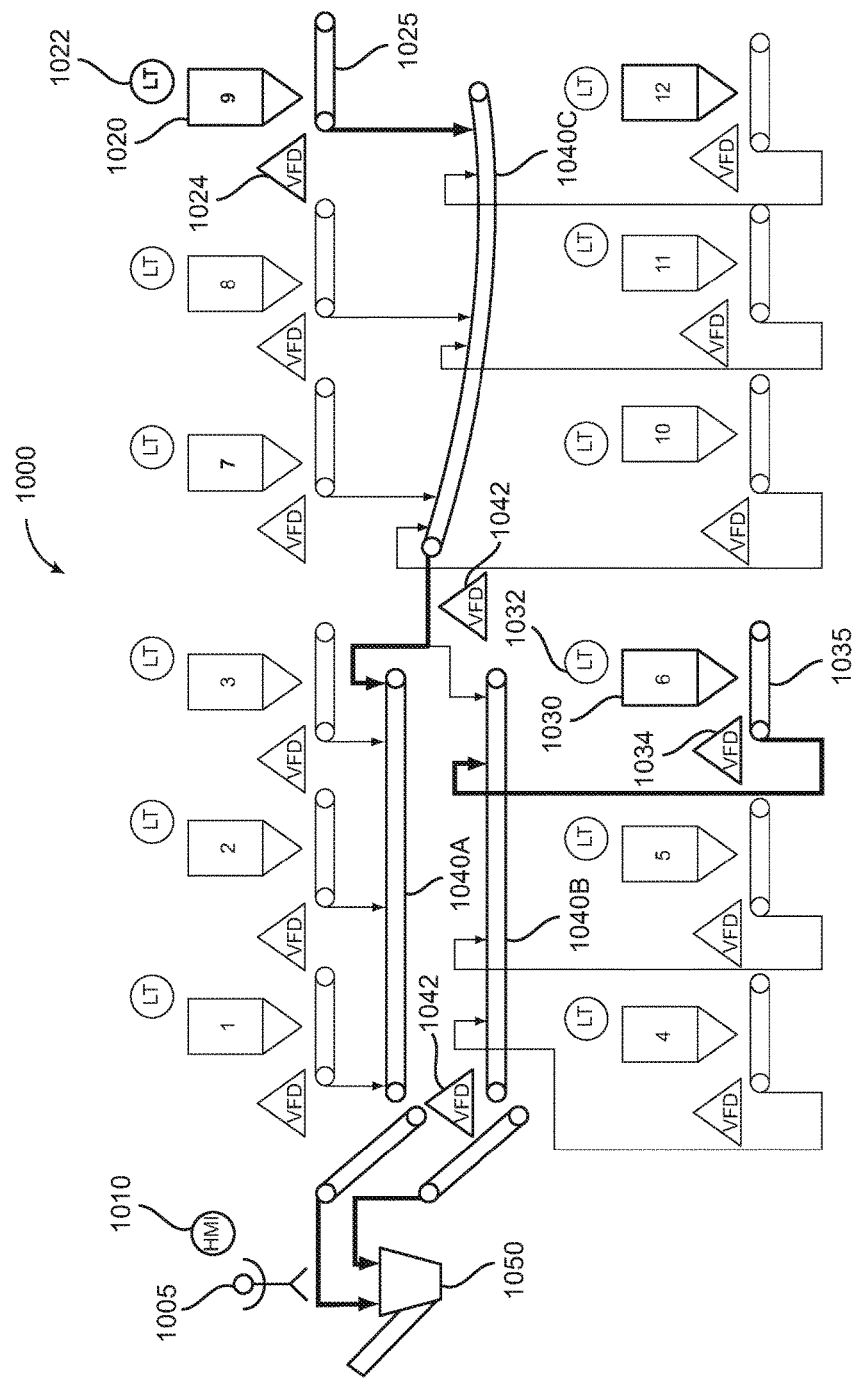

FIG. 10 shows a schematic of a preferred embodiment of the storage and blending process for a two component blend 1000 using a 12-pack system as shown in FIG. 7. The operator 1005 of the blending process manages the storage and blending system at a human machine interface (HMI) 1010 that is interfaced and in communication with the monitoring system, the management system, and the PLCD that controls the various aspects of the process. Before initiating the blending process 1000, the operator 1005 determines the desired blend for the site operation. For a two component blend, the operator determines the identity and the ratio of the two components to be blended.

The component added in the larger quantity to the blend is typically designated the primary or major component and the component added in the smaller quantity is designated the secondary or minor component. For example, the operator may want to pump 200,000 pounds of a primary raw proppant with a 5.0% blend of a secondary coated proppant. The ratio of the two components would be 20:1 raw:coated or primary:secondary. This information is entered into the PLCD at the HMI 1010.

The variable discharge or exit port of the silos holding the primary raw proppant and the secondary coated proppant are set to allow the discharge flow from the two silos to be significantly different. Thus, if flow of component through the exit ports of the two silos are controlled via mechanical choke gates, then the choke gate of the primary component silo might be set for 5 inches and the choke gate of the secondary component silo would have a smaller setting of maybe 0.5 inches. The choke gate settings for the two silos holding the two components (i.e., silo 1020 for the primary raw proppant and silo 1030 for the secondary coated proppant) are entered into the HMI 1010.

Figure 11:
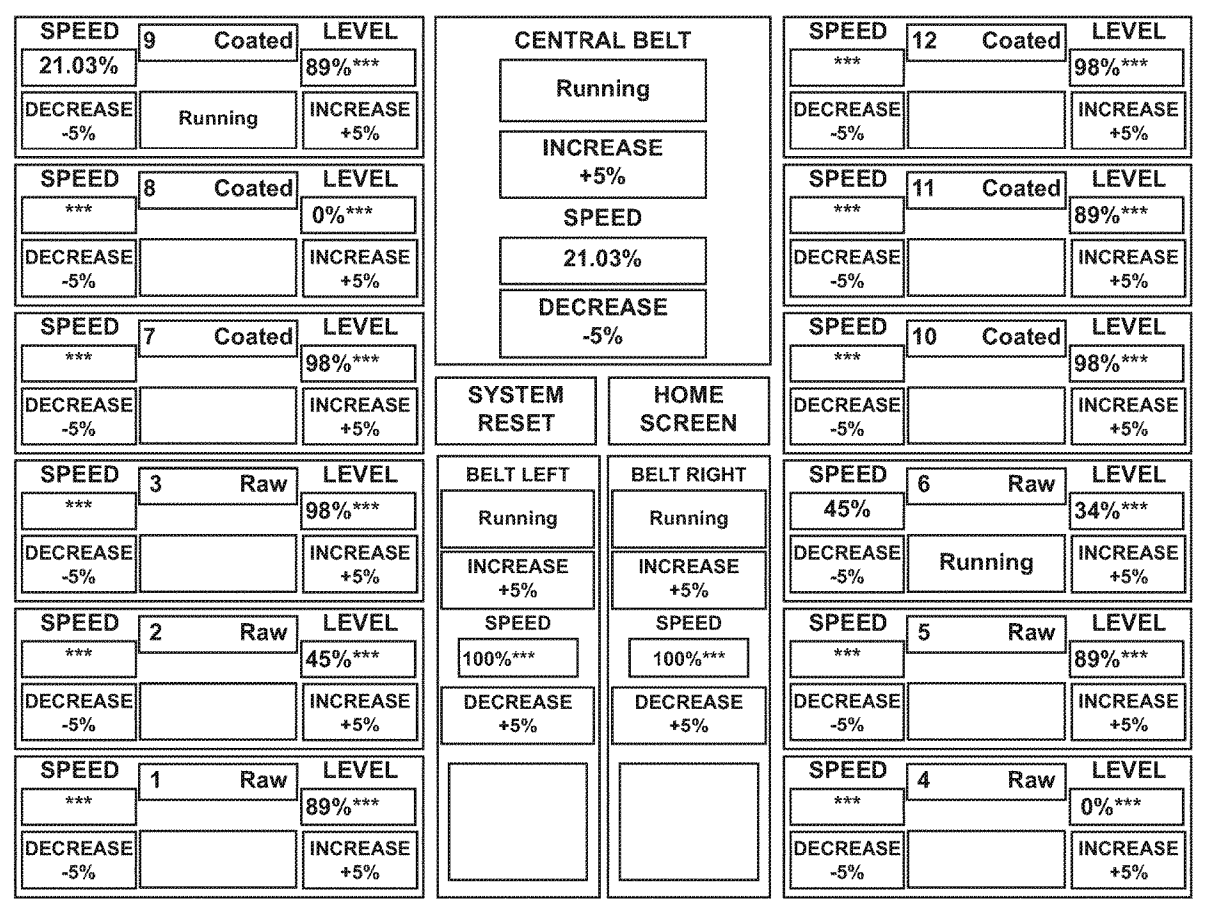

The operator navigates to the main screen on the HMI, illustrated in FIG. 11, that is used to control the blending process. The operator enters the percentage of the components desired in the blend, as well as the choke gate settings on the HMI. The operator then turns on the central conveyors 1040A, 1040B and 1040C at 100% speed. The operator selects the primary silo 1030 and the secondary silo 1020 based on the component contained therein. The rate of inflow of material into the blender 1050 is controlled by governing the speed of the central conveyors and the shuttle conveyors. In this embodiment, the level of material in the blender is monitored by the operator, who will either speed up or slow down the speed of the conveyor belts to control the content level within the blender.

Basically the operator will control the level of material in the blender by either increasing or decreasing the speed of the primary shuttle conveyor 1035 on silo 1030. The PLCD then calculates a remote set point for the appropriate speed for the central conveyors 1040A-C and the secondary shuttle conveyor 1025 based on the operator's input of the choke gate opening for the primary silo 1030 and the secondary silo 1020, as well as the desired blend ratio in decimals.

The PLCD calculates the belt rate of the conveyors based on the real time belt speed of the primary shuttle conveyor 1035 and the gear ratios between the primary conveyors 1040A-C and the secondary shuttle conveyors 1025 and 1035. The PLCD calculates the remote set point (RSP) in Hertz for the VFDs of the conveyors. The basic calculation performed by the PLCD is as follows:

$$RSP_{1025}=RSP_{1035} \times F_{HZ} \times [BR/(C_{1020}/C_{1030})] \times F_{GR}$$

where the RSP of the Secondary Shuttle 1025 ($RSP_{1025}$)= RSP of the Primary Shuttle 1035 ($RSP_{1035}$)×a Factor to convert the percentage Belt Speed into Hertz ($F_{HZ}$)×the Blend Ratio (BR) divided by the ratio of the Choke Gate Openings for the Secondary Silo 1020 ($C_{1020}$) and the Primary Silo 1030 ($C_{1030}$)×a Factor accounting for the difference in the gear ratio between the Primary Shuttle 1035 and the Secondary Shuttle 1025 ($F_{GR}$).

Whenever, the PLCD calculates a change that needs to be made in the speed of the shuttle and central conveyors, the PLCD instructs the VFD 1042 of the motors that run the central conveyors 1040A-C, the VFD 1024 of the motor that runs the secondary shuttle conveyor 1025, and the VFD 1034 of the motor that runs the primary shuttle conveyor 1035 to alter their speeds in direct response to the blender level and the real time belt speed of the primary shuttle conveyor 1035.

The calculated results are automatically used to adjust the secondary shuttle 1025 speed and the speed of the central conveyors 1040A-C. FIG. 11 shows one embodiment of main screen on the HMI and its displayed settings for the blending system 1000 illustrated in FIG. 10. In the example shown in FIG. 11, the operator has selected silo 1030 (numbered silo 6 on the main screen) to provide the raw proppant, or primary component, and silo 1020 (numbered silo 9 on the main screen) to provide the coated proppant, or secondary component. The operator has input a desired blend ratio of 5.00% of the coated to the raw proppant and entered the primary choke gate at 5.0 inches and the secondary choke gate at 0.5 inches. As the operator manages the level of material in the blender, the belt speed of the primary shuttle conveyor has reached 45%. The PLCD has calculated and sent a remote set point of 21.03% (or 12.617 Hz) to the central belt conveyors and the secondary shuttle conveyor.

Alternatively, the blending process may include a level monitor and transmitter over the blender. The level monitor may be any monitoring device such as a laser, non-contact radar, guided wave radar or similar device to monitor the appropriate level in the blender with set predetermined limits. Thus, whenever the level in the blender goes outside of either an upper or lower predetermined limit the PLCD will automatically recalculate a desired speed for the central conveyors and the primary and secondary shuttle conveyors. The recalculated remote set points are sent to the VFDs of the motors running the central conveyors and the primary and secondary shuttle conveyors. By resetting the VFDs, the speed of the central and shuttle conveyors are reset to adjust the material level in the blender to within the predetermined limits. The blending process 1000 can deliver up to 30,000 pounds per minute of proppant or blend mixture to the blender.

Another embodiment, of the blender system 1000 includes a silo monitor 1032 for the primary silo 1030 and a silo monitor 1022 for the secondary silo 1020. The use of silo monitoring within the blending process is described in more detail below.

An Example of a Seven Component Blend

Figure 12:
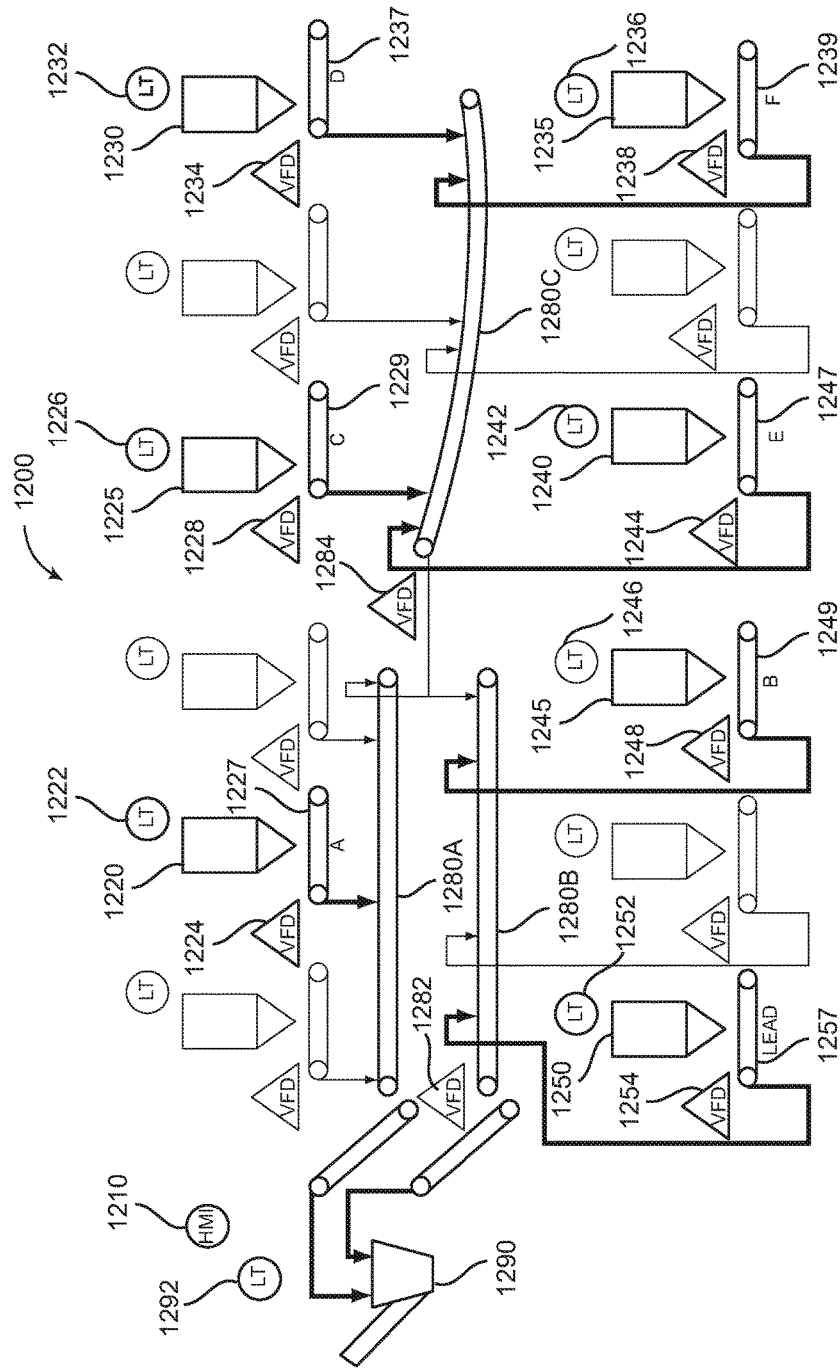

FIG. 12 shows a schematic of one embodiment of the storage and blending process 1200 for a seven component blend using the 12-pack system shown in FIG. 7. The operator monitors the progress of the blending process 1200 at the human machine interface (HMI) 1210 that is interfaced with and in communication with the PLCD that controls the various aspects of the process. Before initiating the blending process 1200, the operator determines the desired blend for the site operation. For a seven component blend, the operator determines the identity and the percentage composition of the seven components to be blended. The component added in the largest quantity to the blend is typically designated the lead component and the desired amount of the other six components to be added is calculated in relationship to the amount of the lead component being added. Furthermore, the secondary shuttle speeds of the six non-lead components are calculated with respect to the primary shuttle speed of the lead component as illustrated in Table 1.

TABLE 1

| Component | Lead | A | B | C | D | E | F |
|---|---|---|---|---|---|---|---|
| % of Blend | 78% | 5.00% | 2.50% | 1.00% | 1.50% | 7.00% | 5.00% |
| Blend Ratio to Lead Component | NA | 6.41% | 3.21% | 1.28% | 1.92% | 8.97% | 6.41% |
| Shuttle Choke Gate (inches) | 5 | 0.5 | 0.25 | 0.25 | 0.25 | 0.5 | 0.5 |
| Shuttle Speed | 45% | 28.8% | 28.8% | 11.5% | 17.3% | 40.4% | 28.8% |

For example, the operator may want to pump 200,000 pounds of the multi-component blend mixture comprising 156,000 pounds of the lead component; 10,000 pounds of components A and F; 5,000 pounds of component B; 2,000 pounds of component C; 3,000 pounds of component D; and 14,000 pounds of component E. The ratio of component A to the lead component would be 5:78 or 6.41%. Similarly the ratios of components A, B, C, D, E, and F are calculated by the PLCD and displayed on the HMI for the operator's reference.

The opening of the choke gate for each silo holding the lead component and the secondary components A, B, C, D, E, and F is entered into the PLCD. The opening of the choke gate for each silo may be set manually, or it may be set automatically if the choke gate, or releasing device on the exit port of the silos, has a variable opening that can be electronically controlled.

The operator then turns on the central conveyors 1280A, 1280B and 1280C at 100% speed. The operator then selects the primary or lead silo 1250 containing the lead component. Secondary silo 1220 containing component A, silo 1225 containing component C, silo 1230 containing component D, silo 1235 containing component F, silo 1240 containing component E, and silo 1245 containing component B are selected based on their respective contents. The PLCD calculates the desired belt rate of all of the conveyors based on the real time belt speed of the lead shuttle conveyor 1257 associated with silo 1250 that contains the lead component and the gear ratios between the central conveyors 1280A-C and the secondary shuttle conveyors 1227, 1229, 1237, 1239, 1247 and 1249. The PLCD calculates remote set points (RSPs) in Hertz for each of the VFDs of the motors that run the conveyor belts.

The basic calculation performed by the PLCD for each of the secondary shuttle conveyors is as follows:

$$RSP_{SEC}=RSP_{LEAD} \times F_H \times [BR/(C_{SEC}/C_{LEAD})] \times F_{GR}$$

where the RSP of each Secondary Shuttle ($RSP_{SEC}$)=RSP of the Lead Secondary Shuttle 1257 ($RSP_{LEAD}$)×a Factor to convert the percentage belt speed into Hertz ($F_H$)×the Blend Ratio (BR) for the component associated with the secondary shuttle divided by the ratio of the Choke Gate Openings for the Secondary Silo ($C_{SEC}$) and the Lead Silo 1250 ($C_{LEAD}$)×a Factor accounting for the difference in the gear ratios between the Lead Shuttle 1257 and the Secondary Shuttle ($F_{GR}$).

The calculated results are automatically used to adjust the belt speed of the secondary shuttles 1227, 1259, 1237, 1239, 1247 and 1249 and the central conveyors 1280A-C. When the level of the blending material in the blender reaches a point that falls within the prescribed limits, the belt speed of the primary lead shuttle conveyor 1257 should have reached about 45%. Then the PLCD calculates a remote set point for of the central and secondary shuttle conveyors. The calculated remote set point is sent to each of the central and secondary shuttle conveyors (e.g., 28.8% to the secondary shuttles of the silos containing components A, B and F).

The level of material flowing into the blender 1290 is controlled by governing the speed of the central and the shuttle conveyors. The level of material in the blender is monitored by a blender level monitor 1292 that transmits the real time blender levels to the PLCD. The level monitor may be any monitoring device such as a laser, non-contact radar, guided wave radar or similar device to monitor the appropriate level in the blender with set predetermined limits. Thus whenever the level in the blender goes outside of either an upper or lower limit, the PLCD automatically calculates a desired speed for the central and secondary conveyors that will bring the level of material in the blender back within the prescribed limits. The PLCD calculates a remote set point for each motor 1282, 1284 running the central conveyors, the motor 1254 running the lead shuttle conveyor, and the motors 1224, 1228, 1234, 1238, 1244, 1248 running the secondary shuttle conveyors. The PLCD transmits the calculated RSP to each motor and instructs the VFDs of those motors to reset the speed of the central and shuttle conveyors to adjust the material level in the blender to within the prescribed limits. Thus the PLCD instructs the VFDs of the lead shuttle conveyor 1257, the secondary shuttle conveyors 1227, 1229, 1237, 1239, 1247 and 1249, and the central conveyors 1280A-C to alter their speeds in direct response to the blender level.

Another embodiment, of the blender system 1200 includes a silo monitor and transmitter for each silo: monitor 1252 for the lead silo, monitor 1222 for silo 1220, monitor 1226 for silo 1225, monitor 1232 for silo 1230, monitor 1236 for silo 1235, monitor 1242 for silo 1240, and monitor 1246 for silo 1245. The use of silo monitoring within the blending process is described in more detail below.

Delivery System

One aspect of the delivery, storage and blending system includes determining a job schedule 1630 based on the desired blend mixture and the exit rate of the blend mixture from the blender. The job schedule includes a system for determining the total amount of each ingredient needed for the project, the defined time intervals of the on-site ingredient requirement for a particular project, the availability of the ingredient at an off-site storage facility 1650, the availability of a truck or tractor trailer 1610 loaded with a specific ingredient, the delivery time for the ingredient from the off-site storage facility to the on-site project, the ingredient fill time from the tractor trailer into the on-site storage container 110, and the impact of the specified blend mixture on the exit rate of the ingredient from on-site storage containers on the on-site ingredient requirement. One example of typical entries needed to determine a job schedule employed in the delivery system 1600 is shown in Table 2.

TABLE 2

Example Entries for Determining Job Schedule

| Ingredient Delivery Time to Site (mins) | 90 mins |
|---|---|
| Ingredient Delivery Time into On-Site Storage (mins) | 45 mins |
| Tractor Trailer Ingredient Capacity (lbs) | 47,000 lbs |
| Blender Maximum Flow Rate (lbs/min) | 15,000 lbs/min |

| Stage | Start Time | Duration (minutes) | Ingredient Type | % of Blend Mixture | Liquid Type | % of Blend Mixture | Qty of Ingredient Required (lbs) |
|---|---|---|---|---|---|---|---|
| 1 | 1:00pm | 5 | 100 | 10 | xxx | 90 | 10000 |
|  |  | 30 | 100 | 15 | xxx | 85 | 45000 |
|  |  | 25 | 100 | 20 | xxx | 80 | 35000 |

TABLE 2-continued

Example Entries for Determining Job Schedule

| | | | | | | | |
|---|---|---|---|---|---|---|---|
| | | 15 | 100 | 10 | xxx | 90 | 25000 |
| | | 15 | 100 | 5 | xxx | 95 | 5000 |
| 2 | 3:30pm | | | | | | |

Once an on-site operations project is contracted, a logistics program is used to calculate a logistics plan of component requirements needed over time (i.e., estimated lbs per minute or hour for each ingredient needed to implement the on-site project). For example, the logistics program will calculate a list of components and the total amount of each component needed for the project, the one or more silos assigned to store each component, the total on-site storage capacity for each component, the discharge rate of each component from its assigned silos, and the component level limits set for alerts. The logistics program is computer implemented and the program will communicate with and be interfaced with the control and management of the ingredient inventory 1670. For example, the logistics program will calculate maximum and minimum limits for each component in its designated silos and estimate the timing of component usage based on the discharge rate and anticipated reloading of that component required over time during the site operation, such as a fracking operation. Thus, the logistics program can estimate the times at which one or more trucks of a particular component will be needed to refill specified storage containers.

The component usage is programmed as a function of the rate of discharge through the discharge device (such as the shuttle belt speed if the discharge unit is a conveyor), the level of the component in the silo, the bulk/density (lb/ft$^3$) of the component, the tables used to convert silo level and the bulk density to the lbs of component used per unit of time, whether the component was loaded into or offloaded from the silo at its last two level readings, and the time. For example, if the discharge rate of the component through the discharge device is greater than zero, the silo is in operation and the component is being discharged; however if the discharge rate is less than or equal to zero then the silo is not in operation and the component is not being discharged. The rate of component discharge is based on the speed of discharge set for the discharge device.

The level of component in each silo is calculated by the PLCD based on the readings provided by the silo monitor 880. The level is reported as the percentage of the silo that is full of component. The determination of the difference in component level in a particular silo between two consecutive level readings determines whether the component is being added to the silo, creating an ascending cone with an ascending angle of repose, or whether the component is being discharged from the silo, creating a descending cone with a descending angle of repose. The angle of repose of the component in the silo is determined based on an analysis of a minimum of two previously-logged silo levels. Since the silo monitor is mounted at a set position within the silo, knowing whether the component has an ascending or a descending cone and the angle of repose of the cone will allow a set angle of repose to be determined and used to determine the level of component in the silo.

The bulk/density is a characteristic of both the mesh size and the type of granular component (e.g., Northern White 100 mesh Brady Brown 40/70 mesh). The component assigned to a particular silo has a certain mesh size (i.e., a silo contains only one mesh size and that mesh size is not changed throughout the site operation). If the same component of a different mesh size is used, it will be assigned to another silo. The mesh size and the type of component will be entered into the HMI 1310 and used to calculate the bulk density of the component. The bulk density (lbs/ft$^3$) of the component and the volume (ft$^3$) of the component in the silo is used to determine the pounds of component in the silo.

The system snapshots all raw data from the field, including the content level of each silo, at designated time intervals. The level readings and the calculated number of pounds of component usage are recorded in minutes and hours requiring a roll-up of multiple raw data readings. Using a combination of an average of readings and a predetermined threshold for a maximum amount of change within a designated interval, errant level readings are identified as outlier values in the discharge rate of a component from a silo.

Typically, a job schedule 1630 is outlined that calculates the total amount of each ingredient needed for the job based on the total requirement of the blend mixture needed, the percentage of each ingredient in the blend mixture, and the exit rate of the blend mixture from the blender. The job schedule 1630 also takes into consideration the amount of the ingredient that can be carried in a tractor trailer 1610, the number of tractor trailers that are required to provide the total amount of ingredient needed for the job, the travel time form the remote storage location 1650 to the well site, and the time needed to transfer the ingredient from the tractor trailer to the designated storage container for the ingredient.

To facilitate the implementation of the job schedule, a continuously updated list or truck inventory 1620 is kept of tractor trailers 1610 and each tractor trailer ingredient manifest. The truck inventory 1620 includes a continually updated list of the tractor trailers 1610 that are available to transport an ingredient from the off-site storage 1650 to the on-site storage container 110 at any given time and which tractor trailers are loaded with which ingredient (the tractor trailer manifest) and how much of that ingredient. The truck inventory list 1620 also includes which drivers with available driving hours are on duty and the travel time from the off-site storage site to the on-site storage container, as well as the type of equipment available on each tractor trailer for downloading the ingredient from the tractor trailer into the on-site storage container.

The delivery system data 1600 is continually updated and communicated to various components of the delivery, storage and blending system. Illustrative examples of such interaction are: the truck inventory list 1620 is communicated to the delivery system 1600, the monitoring system 1700 and the management system 1500, the level/mass/amount of the ingredient contained in specific tractor trailers is submitted to the monitoring system 1700 and the management system 1600, the duration of time required for each tractor trailer to travel from the off-site storage to the on-site storage containers is submitted to the monitoring system and the management system, the duration of time required to upload an ingredient from a tractor trailer into the designated on-site storage container 110 is submitted to the monitoring system and the management system. The management system processes requests to alter the truck inventory list 1620 and then alters the truck inventory list accordingly, the management system also alters the truck inventory list whenever a delivery of a specified ingredient to the on-site storage container has been completed. The management system anticipates the need for more ingredient to be delivered to the site and processes requests to select a tractor trailer from the truck inventory list 1620 to deliver ingredient to the well site by analyzing data on available driver hours, current location of the tractor trailer, and the maintenance status of the tractor trailer.

Coordination of the Delivery, Storage and Blending Systems

The Monitoring System. The monitoring system 1700 collects and displays information from the delivery system 1600, the blender system 800, the silo system 900 and the management system 1500 and communicates the information collected from one system to all of the other relevant systems. The monitoring system in conjunction with the management system provides a mechanism for altering the delivery system (e.g., altering the inventory or job schedule), the ingredient inventory 1670, the silo system and/or the blender system either digitally through a PLCD, the on-site HMI, or as requested by a person.

For example, the monitoring of the silo system measures the silo contents on a real time basis. Such real time measurements are useful for inventory management, determining and controlling the rate of usage, and avoiding over filling or unexpected empty conditions. Each silo 110 may contain one or more devices for monitoring the level of their contents. The monitoring devices may be sonic, radar, optical, inductive or mechanical level monitors.

Likewise, monitoring the blender system to ensure a balance in the inflow and outflow of the blend materials from the blender. If the level/mass/amount of blend material in the blender is determined to be outside the defined limits, a request is submitted to the management system to modify the delivery rate of the blend mixture to the blender or to alter the outflow of materials from the blender using a process exemplified in FIG. 9C. If the inflow of material into the blender is to be altered, the management system correlates the level of adjustment needed to the calibrated delivery rate and instructs the PLCD 956 to alter the speed (i.e., turn off, speed up, or slow) of a shuttle and/or central conveyor for a selected storage container. For example in the two component blend sample exemplified in FIG. 8, the PLCD instructs the VFD 850 of the motor that runs the central conveyor 820 and the VFDs 840, 845 of the motors that run the lead ingredient and shuttle conveyors 830, 835 to alter their speed in direct response to the command from the management system and the real time belt speed of the conveyors 840, 845. Similarly, if the outflow of material out of the blender is to be altered, the management system calculates the adjustment needed to the calibrated blend material outflow or exit rate and instructs the PLCD 956 to alter (i.e., stop, speed up, or slow down) the speed of the blender control device. The management system communicates the altered inflow/outflow rates to the monitoring system which then modifies the corresponding rate changes displayed on one or more PLCD screens as well as communicates all rate changes to the delivery system (block 968). All rate changes affect the usage rate of the blend ingredients necessitating modifications in the ingredient inventory 1670 and the job schedule 1630. All rate changes, truck inventory and ingredient inventory changes are submitted to the monitoring system and the management system. The management system processes requests to alter the truck inventory list 1620 and then alters the truck inventory list accordingly, the management system also alters the truck inventory list whenever a delivery is made.

Figure 13:
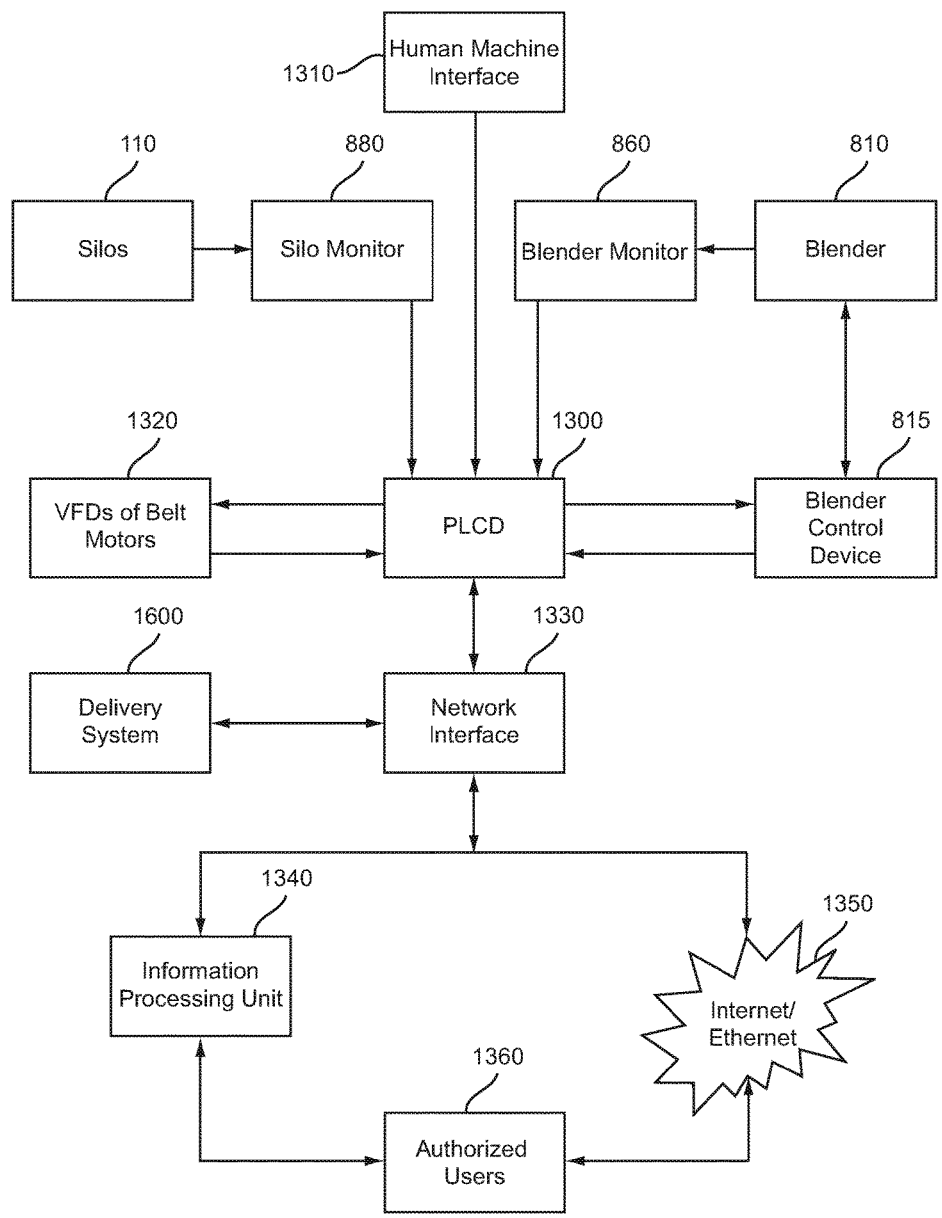

FIGS. 9C and 13 are schematic illustrations of the blending process steps and of the information flow in the PLCD-based operating system and process. The process includes the step of continually monitoring the content level of the silos 110 and the blender 810 with level monitors 880 and 860 respectively. The PLCD-based technology may implement the process at least partially by interfacing with a plurality of devices distributed throughout the system. The monitors may be configured to dynamically measure, sense, and/or otherwise determine the content levels of the silos and the blender. The real time content level data is processed and used to generate instructive signals that are transmitted to the devices within the system in order to maintain their operation within preset limits of optimal performance.

The monitoring system also dynamically communicates with a tractor trailer monitoring device that monitors the amount of an ingredient contained in the tractor trailer rig at any one time, the travel time for the tractor trailer to travel from the off-site storage facility to the on-site storage container, and the required time to deliver the ingredient from the tractor trailer into the storage container.

The Management System. The management system includes (a) one or more computer processors; (b) one or more computer readable storage devices, wherein the one or more computer readable storage devices are not transitory signals; and (c) program instructions stored on at least one of the one or more computer readable storage devices for execution by at least one of the one or more computer processors, the program instructions comprising: (i) program instructions for continuously evaluating a level, a mass or an amount of an ingredient stored in one or more designated silos; (ii) program instructions for continuously evaluating a level, a mass or an amount of a predetermined blend mixture in a blender; (iii) program instructions for submitting a request to a blender system to adjust a delivery rate or an exit rate of the blend mixture into or out of the blender; and (iv) program instructions for submitting a request to a silo system to adjust a delivery rate of one or more ingredients from the one or more silos into the blender.

The management system also includes program instructions for receiving and processing a job schedule including: (a) the blend mixture containing a controlled quantity of each ingredient in a set of ingredients and an outflow rate of the blend mixture from a blender; (b) a total amount of each ingredient required for a job; (c) a load amount of each ingredient carried in a tractor trailer for delivery of the ingredient to a well site; (d) a total number of the tractor trailers required to complete the job; and (e) a delivery time for transporting the tractor trailers from a remote storage facility to the well site and loading the load amount of the ingredient into the designated silo.

The management system 1500 is calibrated with a pre-operation test such that a person activates the blender, and interacts with the HMI to deliver ingredient from each silo 110 at a pre-determined rate for a pre-determined duration of time. For each time interval during which ingredient is delivered to the blender, the blender communicates to the management system an indication of whether the level/mass/amount of ingredient measured by the blender monitor is above or below a pre-determined level/mass/amount. The calibration establishes a direct relationship between the level/mass/amount of ingredient measured by the blender monitor to the speed of the shuttle and central conveyors and the position of the silo 110 relative to the blender hopper 150.

A user inputs the job schedule 1630 into the management system 1500. The job schedule may be in the form of an electronic document or may be input through a computer interface. The management system electronically communicates the job schedule 1630 to the blender system 800 and the monitoring system 1700 through an Ethernet cable, a satellite connection or a cellular connection.

The management system 1500 may parse the job schedule 1630 and the calibration data and calculate/build/create an ingredient inventory 1670 that is utilized to forecast when, what type and what quantities of additional ingredient will be required from the remote storage facility 1650. The ingredient inventory forecast may be presented on a computer and/or handheld device screen. In one embodiment of the invention, the management system calculates/builds/creates in real-time an ingredient inventory forecast for a defined duration of time; for example, for the next two stages of ingredient delivery as defined by the job schedule.

In one embodiment of the system, an operator may activate execution of the job schedule by clicking on a button on a computer screen with a label indicating "Begin Schedule" or "Execute Schedule" or "Start" where the button may be an element of the computer program that is part of the monitoring system. In response to the operator activating execution of the job schedule, the blender instructs the blender control device to begin the outflow of the blend materials. The management system instructs the PLCD to activate the VFD and the central conveyor at the speed commensurate with the calibrated delivery rate to cause the delivery of ingredient to be within the limits defined in the job schedule.

If the blender determines the level/mass/amount of ingredient is outside the defined limits, it submits a request to the management system to modify the delivery rate. The management system correlates the level of adjustment needed to the calibrated delivery rate and instructs the PLCD 1300 to alter the speed of the shuttle and central conveyor for a selected storage container, the PLCD instructs the VFD 1042 of the motors that run the central conveyors 1040A-C and the VFD 1034 of the motor that runs the shuttle conveyor 1035 to alter their speed in direct response to the command from the management system and the real time belt speed of the shuttle conveyor 1035. The management system communicates the altered delivery rate to the monitoring system, the monitoring system modifies the corresponding speed value displayed on the computer screen.

The management system continuously evaluates the information supplied by the monitoring system on the level/mass/amount of material in the blender, the level/mass/amount of ingredient in each storage container, the quantity and type of ingredient listed on each tractor trailer and the duration of time needed for each ingredient delivery. The monitoring system in conjunction with the management system continuously compares level/mass/amount of ingredient in each storage container and the quantity and type of ingredient at a remote storage site, loaded on an operating tractor trailer, and any tractor trailers en route to deliver ingredient to the job schedule. The management system submits a request to the delivery system for the delivery of a specific ingredient whenever the amount of on-site ingredient is below the limits defined by the job schedule. Thus, the management system continuously evaluates a total amount of each ingredient available at the well site, a total amount of each ingredient available at a remote storage facility, and a delivery time needed to truck a load of each ingredient from the remote storage facility to the on-site ingredient storage container such that whenever the amount of the ingredient available at the well site falls outside of predetermined limits the management system request the delivery system to select a tractor trailer from truck inventory to deliver the ingredient to the well site.

Alternatively, the management system builds an inventory forecast based upon the estimated delivery times and the job schedule. The management system continuously compares actual ingredient inventory to the forecast inventory and submits a request to the delivery system for delivery of ingredient when the available on-site ingredient is below limits defined by the inventory forecast.

Interaction of the Monitoring and Management Systems. Preferred embodiments of the monitoring system 1700 and the management system 1500, shown in FIG. 16, constantly communicate with the delivery system 1600, the silo system 900 and the blender system 800 and authorized users 1630, 1640. The monitoring system and/or the management system preferred embodiments include diversified communications equipment allowing the monitoring system and/or the management system to communicate with the Internet and/or an Ethernet 1620. The monitoring system 1700 and/or the management system 1500 typically include at least one of the following communication devices: a switch to connect to a cellular antenna or a satellite antenna, a satellite antenna or a cellular antenna to communicate via a cellular communication tower. The monitoring system is designed to establish and maintain communications with the Internet and/or an Ethernet 1620 and all authorized users.

Generally, authorized users fall into different categories with access to different data. For example, authorized data users 1640 include all on-site operation personnel that may have access to all the raw field data, the calculated data, and the logged historical data over the time of that particular site operation. Another example of an authorized data user might be the employees or administrators of a service company or component supplier. Like the on-site operation personnel, the service provider personnel may have access to all the raw field data, the calculated data, and the logged historical data over the time of that particular site operation; however, the service provider personnel may also have access to the delivery system information such as the inventory of tractor trailers, off-site ingredient supplies and delivery schedules. Only authorized users categorized as authorized operators 1640 can create or modify the data and/or system parameters such as altering the job schedule.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In certain preferred embodiments, the management system 1500 illustrated in FIG. 15 provides for the automatic coordination and control of the delivery system 1600, the monitoring system 1700, the silo system 900, and the blending system 800. Thus, the management system 1500 provides for the automatic control and regulation of the blending and flow of granular solid components from the storage containers to the hopper or blender. The management system 1500 includes one or more pre-set programs that allow for modifications and options determined by on-site conditions at the site operation and the input of real time system variables.

The operating technology of the management system and the monitoring system is PLCD-based and removes the need to have visual monitoring of the silos, primary and secondary feeders, and the blender. The PLCD-based operating technology reduces the number of technicians required at a given site location and the costly side effects of potential human mistakes. Preferred embodiments of the automated storage and blending system only requires one technician to operate the entire on-site system, whereas conventional systems require up to six on-site technicians. The PLCD-based storage and blending system allows the on-site technician or operator to adjust and change the blending of components through an on-site human machine interface (HMI) to meet the changing needs of the on-site operation.

In certain embodiments, the process may be a computer-implemented process (e.g., executable on the electronic control system or PLCD). The PLCD may implement the process by acquiring real-time operational data from the central and shuttle conveyors, the blender level monitor, and the silo monitors; evaluating the data against stored prescribed limits for the optimal performance of each aspect of the storage and blending system, and outputting appropriate control signals to interfaced devices within the system to maintain the operation of those devices within the stored prescribed limits to achieve an optimized multi-component mixture for a variety of desired blends throughout an ongoing site operation.

The PLCD 1300 typically includes or is interlinked with the silo monitors 880, an on-site Human Machine Interface 1310, the VFDs of the belt motors 1320 for the lead and secondary shuttle conveyors and the central conveyors, the blender level monitor 860 of the blender 810, the blender control device 815, the delivery system 1600 with its tractor trailer list of loaded available tractor trailers and drivers, one or more Network Interfaces 1330, one or more Information Processing Units 1340, communication networks such as the Internet/Ethernet 1350, Authorized Users 1360, and one or more communication buses for interconnecting the devices within the system.

For example, the desired operating data, as well as actual operating data, for the blending system configured to produce a plurality of multi-component blends can be retrieved and stored in memory. Memory includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory optionally includes one or more storage devices remotely located from the PLCD. Memory, or alternately the non-volatile memory device(s) within memory, includes a non-transitory computer readable storage medium. In some implementations, memory or the computer readable storage medium of memory stores: the data from the various blending programs for a variety of multi-component blends and the operational data from the processing and use of those blends, or a subset of such data; an operating system that includes procedures for handling various basic system services and for performing hardware dependent tasks; a network communication module that is used for connecting the PLCD 1300 to other computers or to an Information Processing Unit 1340 via the one or more communication network interfaces 1330 (wired or wireless) and one or more communication networks 1350, such as the Internet, other Wide Area Networks, Local Area Networks, Personal Area Networks, metropolitan area networks, Virtual Private Networks, local peer-to-peer and/or ad-hoc connections, and so on; and Authorized Users 1360.

The PLCD 1300 and/or the Information Processing Unit may include control logic that can utilize the stored data to determine variables in the processing and performance of the different multi-component blends that have been made and tested. The control logic of the PLCD will continually communicate the data analyzed by the PLCD to the Information Processing Unit.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a non-transitory computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing provides a detailed description of the invention which forms the subject of the claims of the invention. It should be appreciated by those skilled in the art that the general design and the specific embodiments disclosed might be readily utilized as a basis for modifying or redesigning the natural gas supply system to perform equivalent functions, but those skilled in the art should realized that such equivalent constructions do not depart from the spirit and scope of the invention as set forth in the appended claims.

What is claimed is:

1. A well site ingredient management system, the management system comprising a non-transitory computer-readable storage medium storing executable computer program instructions, the instructions executable to perform steps comprising:
   (a) monitoring a level, a mass or an amount of an ingredient stored in one or more designated silos associated with a silo system;
   (b) evaluating a level, a mass or an amount of a predetermined blend mixture in a blender associated with a blender system;
   (c) automatically, in response to a detected level, mass or amount of the predetermined blend mixture in the blender, adjusting an outflow rate of the blend mixture into or out of the blender;
   (d) automatically, in response to a detected level, mass or amount of the ingredient stored in the one or more designated silos, adjusting a delivery rate of one or more ingredients from the one or more silos into the blender; and
   (e) activating execution of a job schedule, wherein in response to activating the execution of the job schedule, the blender instructs a blender control device to begin outflow of the blend mixture, the job schedule comprising:
      (i) the blend mixture and the outflow rate of the blend mixture from the blender;
      (ii) a total amount of each of the one or more ingredients required for a job;
      (iii) a load amount of each ingredient carried in a tractor trailer for delivery of the one or more ingredients to a well site;
      (iv) a total number of the tractor trailers required to complete the job; and
      (iv) a delivery time for transporting the tractor trailers from a remote storage facility to the well site and loading the load amount of the ingredient into a designated silo.

2. The management system according to claim 1, further comprising computer program instructions for modifying the job schedule in accordance with an adjustment to a delivery rate of the one or more ingredients.

3. The management system according to claim 1, further comprising computer program instructions for submitting the job schedule to a monitoring system.

4. The management system according to claim 3, wherein the monitoring system further comprising a programmable logic controller device (PLCD) comprising computer program instructions for increasing, decreasing or stopping the outflow rate of the blend mixture from the blender by altering a speed setting of the blender control device.

5. The management system according to claim 4, wherein the management system further comprising computer program instructions for submitting an available amount of each ingredient to the monitoring system.

6. The management system according to claim 4, further comprising computer program instructions for communicating with a delivery system, the instructions for communicating with a delivery system executable to perform steps comprising:
   receiving and processing a truck inventory, wherein the truck inventory comprises a listing of tractor trailers for delivering the ingredient from the remote storage location to the well site;
   receiving and processing information on a tractor trailer ingredient manifest and submitting the processed information to the monitoring system and the management system;
   monitoring information on the level, the mass or the amount of the one or more ingredients contained in each tractor trailer and submitting the monitored information to the monitoring system and the storage management system;
   monitoring information on the duration of time for each tractor trailer to travel from the remote storage facility to the well site and submitting the monitored information to the monitoring system and the management system;
   monitoring information on the duration of time for delivering the solid granular material from a tractor trailer into a storage container and submitting the monitored information to the monitoring system and the management system;

processing a request from the monitoring system to alter the tractor trailer list;

processing a notification of delivery completion from the management system and adjusting the truck inventory; and processing a request from the management system to select a tractor trailer from the truck inventory used for delivering the ingredient from the remote storage location to the well site, wherein the selection is dependent on at least one of available driver hours, current location of the tractor trailer, and maintenance status of the tractor trailer.

7. The management system according to claim 6, wherein the monitoring system further comprises computer program instructions for collecting and displaying information from the delivery system, the blender system, the silo system and the management system.

8. The management system according to claim 7, wherein the monitoring system further includes computer program instructions for altering the truck inventory upon request.

9. The management system according to claim 7, wherein the management system further comprises computer program instructions for continuously evaluating a quantity and type of each of the ingredients listed on each tractor trailer manifest and the delivery time for each tractor trailer to deliver the ingredient from the remote storage facility to the designated silo.

10. The management system according to claim 7, wherein the management system further comprises computer program instructions for comparing the silo level, the mass or the amount of the ingredient in each storage container and quantity and type of the ingredient in delivery to the job schedule and submitting a request to the delivery system for delivery of the ingredient when the amount of the ingredient is below the limits defined by the job schedule.

11. The management system according to claim 7, wherein the management system further comprises computer program instructions for notifying the delivery system when delivery of the ingredient from the tractor trailer into the designated silo has completed.

12. The management system according to claim 7, wherein the silo system is configured to receive information from one or more silo monitoring devices for detecting the mass, the level or the amount of the ingredient in the silo, wherein the monitoring devices are one of a sonar, a radar, an optical, an inductive or a mechanical level monitor.

13. The management system according to claim 6, further comprising interlinking a silo system with the blender system, and further comprising computer program instructions for:

(a) monitoring and collecting information on the level, the mass or the amount of the ingredient in each silo associated with the silo system;

(b) submitting the collected information to the monitoring system and the management system;

(c) submitting the delivery rate of the ingredient from a designated silo into the blender to the monitoring system; and (d) processing requests from the management system to adjust the delivery rate of the ingredient from the silo into the blender;

(e) activating an ingredient delivery whenever an upcoming need for additional ingredient at the well is predicted by the ingredient forecast.

\* \* \* \* \*